(12) United States Patent
Akash

(10) Patent No.: US 10,972,402 B1
(45) Date of Patent: Apr. 6, 2021

(54) DYNAMIC MANAGEMENT OF INLINE ENTRIES IN HARDWARE ACROSS PROTOCOLS IN A SCALED ENVIRONMENT

(71) Applicant: Juniper Networks, Inc., Sunnyvale, CA (US)

(72) Inventor: Umang Akash, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 10 days.

(21) Appl. No.: 16/586,735

(22) Filed: Sep. 27, 2019

(51) Int. Cl.
*H04L 12/50* (2006.01)
*H04L 12/801* (2013.01)
*H04L 12/26* (2006.01)
*H04L 12/28* (2006.01)
*H04Q 11/04* (2006.01)
*H04L 12/865* (2013.01)
*H04L 12/935* (2013.01)
*H04L 12/911* (2013.01)
*H04L 12/927* (2013.01)

(52) U.S. Cl.
CPC ........ *H04L 47/6275* (2013.01); *H04L 47/805* (2013.01); *H04L 47/826* (2013.01); *H04L 49/3009* (2013.01)

(58) Field of Classification Search
CPC ............ H04L 47/6275; H04L 49/3009; H04L 47/826; H04L 47/805; H04L 45/12; H04L 45/026; H04L 45/028
USPC ........................................................ 709/223
See application file for complete search history.

(56) References Cited

U.S. PATENT DOCUMENTS

| | | | | |
|---|---|---|---|---|
| 6,118,760 A | * | 9/2000 | Zaumen | H04L 29/06 370/229 |
| 6,473,403 B1 | * | 10/2002 | Bare | H04L 45/12 370/236 |
| 7,215,637 B1 | | 5/2007 | Ferguson et al. | |
| 7,310,314 B1 | * | 12/2007 | Katz | H04L 45/00 370/238 |

(Continued)

OTHER PUBLICATIONS

"IEEE 802.1ag," CFM Protocol, Wikipedia, https://en.wikipedia.org/wiki/IEEE_802.1ag, accessed Sep. 20, 2019, 3 pp.

(Continued)

*Primary Examiner* — Kevin T Bates
*Assistant Examiner* — Golam Mahmud
(74) *Attorney, Agent, or Firm* — Shumaker & Sieffert, P.A.

(57) ABSTRACT

Techniques within a network device to execute periodic packet management (PPM) used to determine the health of a network. The inline mode of periodic packet management may be more efficient than other modes of periodic packet management such as centralized mode or distributed mode. The number of inline entries for a given hardware table may be limited, which means that once the number of inline entries in the table has reached the size limit, then any new entries must be managed in the distributed mode or the centralized mode. The techniques of this disclosure may improve the efficiency of a network device by replacing inline entries handled at a lower frequency in the hardware table with entries for periodic packets that are handled with a higher frequency (shorter periodic interval). In this manner, the entries with shorter periodic intervals may be managed using the more efficient inline mode.

20 Claims, 10 Drawing Sheets

(56) References Cited

U.S. PATENT DOCUMENTS

| | | | | |
|---|---|---|---|---|
| 7,395,351 | B1 * | 7/2008 | Nucci | H04L 41/0654 370/238 |
| 7,613,121 | B2 * | 11/2009 | Chou | H04L 45/12 370/231 |
| 7,633,944 | B1 * | 12/2009 | Chang | H04L 43/028 370/389 |
| 7,720,061 | B1 * | 5/2010 | Krishnaswamy | H04L 45/00 370/389 |
| 8,081,572 | B1 * | 12/2011 | Carney | H04L 47/6275 370/236 |
| 8,352,998 | B1 * | 1/2013 | Kougiouris | H04L 63/20 726/1 |
| 8,432,906 | B2 * | 4/2013 | Wu | H04L 45/28 370/389 |
| 8,806,058 | B1 | 8/2014 | Mackie et al. | |
| 8,913,490 | B1 * | 12/2014 | Barman | H04L 45/50 370/228 |
| 8,996,798 | B1 * | 3/2015 | Dropps | H04L 12/413 711/108 |
| 9,258,234 | B1 * | 2/2016 | Addepalli | H04L 67/142 |
| 9,590,894 | B2 * | 3/2017 | Ramachandran | H04L 45/507 |
| 10,243,865 | B2 * | 3/2019 | Izenberg | H04L 45/30 |
| 10,310,897 | B2 * | 6/2019 | Drysdale | G06F 9/544 |
| 10,374,936 | B2 * | 8/2019 | Singh | H04L 43/10 |
| 10,680,944 | B2 * | 6/2020 | Mahishi | H04L 45/64 |
| 2006/0018266 | A1 * | 1/2006 | Seo | H04L 65/80 370/252 |
| 2008/0044181 | A1 | 2/2008 | Sindhu | |
| 2008/0101354 | A1 * | 5/2008 | Arndt | H04L 69/22 370/389 |
| 2008/0225731 | A1 * | 9/2008 | Mori | H04L 47/11 370/242 |
| 2009/0154349 | A1 * | 6/2009 | Bernard | H04Q 11/0067 370/235 |
| 2013/0107872 | A1 * | 5/2013 | Lovett | H04L 12/4645 370/352 |
| 2017/0251064 | A1 * | 8/2017 | Xie | H04L 47/822 |
| 2018/0167325 | A1 * | 6/2018 | Li | H04L 45/64 |
| 2019/0222504 | A1 | 7/2019 | Kananda et al. | |
| 2019/0306282 | A1 * | 10/2019 | Masputra | H04L 47/2475 |

OTHER PUBLICATIONS

"CS242: Object-Oriented Design and Programming," https://www.dre.vanderbilt.edu/~schmidt/PDF/timer-queue.pdf, 1997, 7 pp.

"IEEE 802.3ah OAM Link-Fault Management Overview," TechLibrary, Juniper Networks, Inc., https://www.juniper.net/documentation/en_US/junos/topics/concept/interfaces-ieee-802-3ah-oam-link-fault-management-overview.html, Oct. 14, 218, 4 pp.

"Open Shortest Path First," Wikipedia, https://en.wikipedia.org/wiki/Open_Shortest_Path_First, accessed Sep. 20, 2019, 12 pp.

"Virtual Router Redundancy Protocol," Wikipedia, https://en.wikipedia.org/wiki/Virtual_Router_Redundancy_Protocol, accessed Sep. 20, 2019, 3 pp.

* cited by examiner

EXAMPLE INLINE PRIORITY QUEUE 72A

| Identifier | Protocol | Periodic Interval |
|---|---|---|
| 163.25.1.77 | VRRP | 3 sec |
| 164.23.1.28 | LFM | 3 sec |
| 95.51.16.283 | LACP | 1 sec |
| 114.36.2.56 | LFM | 1 sec |
| 146.58.2.66 | BFD | 55 msec |
| 165.45.2.7 | BFD | 25 msec |
| 114.25.1.38 | BFD | 7 msec |
| ● ● ● | | |

82

EXAMPLE DISTRIBUTED PRIORITY QUEUE 76A

| Identifier | Protocol | Periodic Interval |
|---|---|---|
| 145.25.1.158 | CFM | 3 sec |
| 165.96.1.45 | VRRP | 3 sec |
| 163.25.1.77 | VRRP | 3 sec |
| 165.42.2.39 | LFM | 5 sec |
| 124.11.6.39 | OSPF | 10 sec |
| 145.25.3.154 | BFD | 12 sec |
| 135.47.1.56 | LACP | 30 sec |
| ● ● ● | | |

DYNAMIC MANAGEMENT OF INLINE ENTRIES IN HARDWARE ACROSS PROTOCOLS IN A SCALED ENVIRONMENT

TECHNICAL FIELD

This disclosure relates generally to computer networks, and more specifically, to periodic communications between devices in a computer network.

BACKGROUND

A computer network is a collection of interconnected computing devices that can exchange data and share resources. In a packet-based network, such as the Internet, the computing devices communicate data by dividing the data into small blocks called packets, which are individually routed across the network from a source device to a destination device. The destination device extracts the data from the packets and assembles the data into its original form. Dividing the data into packets enables the source device to resend only those individual packets that may be lost during transmission.

Certain network devices, including routers, switches and similar network devices, maintain routing information that describes available routes through the network and other network health information, such as protocol state. Each route defines a path between two locations on the network. For example, upon receiving an incoming packet, the network device examines information within the packet and forwards the packet in accordance with the routing information. In order to maintain an accurate representation of a network, network devices maintain control-plane peering sessions through which they exchange routing or link state information that reflects the current topology of the network.

Network devices may exchange periodic packets with each other via the peering sessions to confirm connectivity and to indicate operational status of each device. These periodic packets are sometimes referred to as "keepalives" or "hellos." For example, a network device may send periodic packets to a peer network device every 50 milliseconds (ms) to indicate that the network device is still operational. Likewise, the network device may detect reception of corresponding periodic packets from the peer network device within the same period of time (e.g., 50 ms). When a packet is not received in the allotted time frame, the network device determines that a network event has occurred, such as failure of the peer network device or failure of a link or node connecting the two network devices. Consequently, the network device may update various routing information, protocol state information, and so on to redirect network traffic and may issue a number of routing protocol update messages to neighboring network devices indicating a topology change.

SUMMARY

In general, the disclosure is directed to techniques within a network device to efficiently manage periodic packets sent to peer network devices to determine the health of a network connection. Each link to a peer network device may have one or more associated entries stored within a local network device that may include transmit (TX) packet and receive (RX) packet information for periodic packet communication between a local network device and one or more peer network devices within the network. An example of processing circuitry at the hardware level may include an application specific integrated circuit (ASIC). During an inline mode of periodic packet management, the ASIC may handle periodic packet management communication sessions at the hardware level. The ASIC may use a hardware table to store and manage entries. Another example of processing circuitry includes a programmable processor configured to execute instructions stored in a computer-readable storage medium to carry out the techniques of this disclosure.

Periodic packets handled in centralized mode may managed by a control plane of the local network device. Periodic packets handled in distributed mode may be managed by one or more software processes in the control plane and by lower level processing circuitry, such as a software process executing on a processor on one or more line cards (LC) of the local network device. The inline mode of periodic packet management may be more efficient than other modes of periodic packet management such as centralized mode or distributed mode, because the inline mode sends most of the periodic packet at the ASIC level and does not require sending a periodic packet manager software process (and expending corresponding processing resources) running on the line cards, or the use of control plane processing resources to manage and send or received periodic packets to or from the control plane. The number of inline entries for a given hardware table may be limited, however, based the design of the processing circuitry. The limit on the amount of space available in the hardware table means that once the number of entries in the table for the ASIC has reached the size limit, then any new entries must be managed in the distributed mode or the centralized mode. The techniques of this disclosure allow a network device to selectively replace inline entries in the hardware table with entries for periodic packets that are handled with a higher frequency (shorter periodic interval) when the hardware table is full. In this manner, the entries with shorter periodic intervals may be managed using the more efficient inline mode, while entries with longer periodic intervals may be managed using distributed mode. The techniques may improve efficiency of the network device operation.

In one example, the disclosure is directed to a method comprising: detecting, by a network device, an event, wherein the event triggers management of one or more periodic packet entries handled by the network device; in response to detecting the event, determining whether an inline hardware table has space available, in response to determining that there is no space available in the inline hardware table, comparing, by the network device, a first periodic interval of a head node of a first priority queue to a second periodic interval of a head node of a second priority queue: wherein the first priority queue comprises first nodes associated with a first set of entries operating under a distributed mode of periodic packet management, wherein in the distributed mode, periodic packet management is handled by processing circuitry at a software level of the network device, wherein a head node of the first priority queue is associated with a distributed entry with the first periodic interval, wherein the first periodic interval is the shortest periodic interval relative to the first nodes in the first priority queue, wherein the second priority queue comprises second nodes associated with a second set of entries operating under an inline mode of periodic packet management, wherein in the inline mode, periodic packet management is handled by processing circuitry at a hardware level of the network device; wherein the head node of the second priority queue is associated with an inline entry with the second periodic interval, wherein the second periodic interval is the longest periodic interval relative to the second nodes in the second priority queue; and in response to determining based on the comparing that the first periodic interval is shorter than the second periodic interval: assigning, by the network device, the inline entry associated with the head node of the second priority queue to the first set of entries operating under the distributed mode; deleting, by the network device, the head node of the second priority queue, wherein deleting the head node of the second priority queue causes the network device to assign a second node of the second priority queue as the head node of the second priority queue; and assigning, by the network device, the distributed entry associated with the head node of the first priority queue to the second set of entries operating under the inline mode.

In another example, the disclosure is directed to a network device comprising: a control unit configured to execute at least one periodic packet protocol, the control unit comprising: a periodic packet manager (PPM) configured to: detect an event; determine whether an inline hardware table has space available; in response to detecting the event and a determination that the inline hardware table has no space available, compare a first periodic interval of a head node of a first priority queue to a second periodic interval of a head node of a second priority queue; in response to a determination, based on the comparison, that the first periodic interval for the head node of the first priority queue is shorter than the second periodic interval for the head node of the second priority queue: add a first inline entry associated with the head node of the second priority queue to a first set of entries; in response to adding the first inline entry to the first set of entries, delete the first inline entry from a second set of entries; add a first distributed entry associated with the head node of the first priority queue to the second set of entries; and in response to adding the first distributed entry to the second set of entries, delete the first distributed entry from the first set of entries.

In another example, the disclosure is directed to computer-readable, non-transitory, storage medium encoded with instructions that when executed cause a programmable processor of the network device to: execute at least one periodic packet protocol; detect an event; determine whether an inline hardware table has space available; in response to detecting the event and a determination that the inline hardware table has no space available, compare a first periodic interval of a head node of a first priority queue to a second periodic interval of a head node of a second priority queue; in response to a determination, based on the comparison, that the first periodic interval for the head node of the first priority queue is shorter than the second periodic interval for the head node of the second priority queue: add a first inline entry associated with the head node of the second priority queue to a first set of entries; in response to adding the first inline entry to the first set of entries, delete the first inline entry from a second set of entries; add a first distributed entry associated with the head node of the first priority queue to the second set of entries; and in response to adding the first distributed entry to the second set of entries, delete the first distributed entry from the first set of entries.

The details of one or more examples of the disclosure are set forth in the accompanying drawings and the description below. Other features, objects, and advantages of the disclosure will be apparent from the description and drawings, and from the claims.

BRIEF DESCRIPTION OF DRAWINGS

FIG. 4 is a conceptual diagram illustrating an example of a distributed priority queue and an inline priority queue.

DETAILED DESCRIPTION

The disclosure is directed to techniques within a network device to efficiently execute periodic packet management (PPM) used to determine the health of a network. Each link to a peer network device may have one or more associated entries stored within a local network device that may include transmit (TX) packet and receive (RX) packet information for periodic packet communication between a local network device and one or more peer network devices within the network. Periodic packets sent with a higher frequency (shorter periodic interval) may be more efficiently handled at the hardware level rather than the software level. But the number of entries for a given hardware table may be limited. In some examples, the hardware table size may be limited to 16K, 32K, 64K or other size limit. The hardware table may be used by the network device to contain a listing of periodic packet communications for the inline mode of periodic packet management (PPM). The inline mode may be more efficient than centralized mode or distributed mode because the inline mode may consume less of the processing power available in the local network device. But the limit on the space available for the hash table means that once the number of entries in the hash table for the ASIC has reached the size limit, then further entries must be managed in the distributed mode or the centralized mode.

The techniques of this disclosure may improve the efficiency of network device operation by dynamically and selectively replacing inline entries in a hardware table with higher frequency entries, as needed. The software operating on the control plane may compare the periodic intervals for inline entries in the hardware table with periodic intervals of entries handled in distributed mode or centralized mode. In this manner, the higher frequency entries may be managed using the more efficient inline mode, while entries with lower frequency (longer periodic intervals) may be managed using distributed mode, or in some examples centralized mode. In some examples, distributed mode packets may be handled by software operating on one or more line cards, unless there is any change in protocol state for session. As described above, inline mode is more efficient than distributed mode or centralized mode because periodic packets are handled at the hardware level. In this manner, inline mode reduces resource overhead that is required to transmit and receive periodic packet to and from the control plane.

Figure 1:
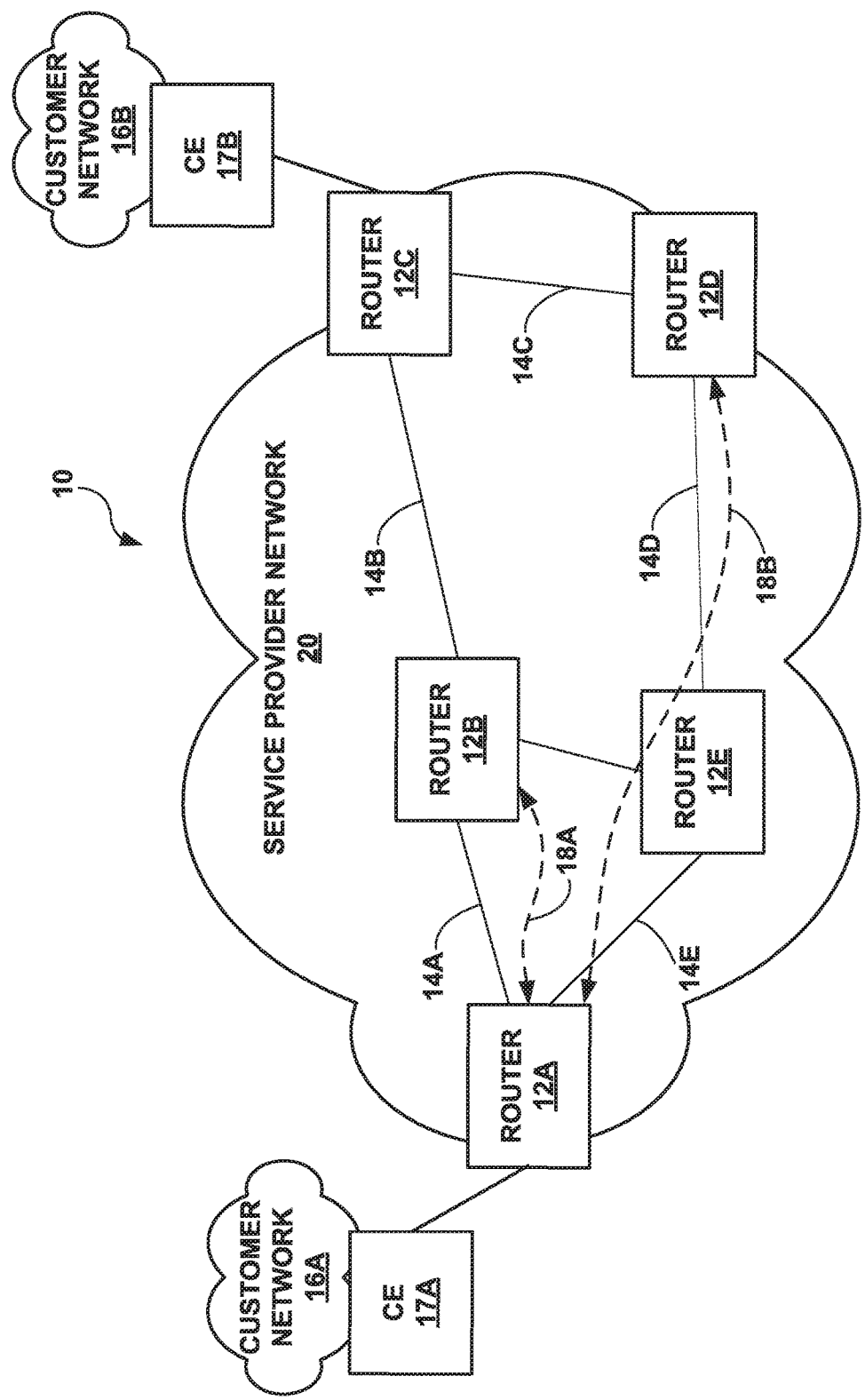
FIG. 1 is a block diagram illustrating an example network system in which techniques described herein may be implemented.

FIG. 1 is a block diagram illustrating an example network system in which techniques described herein may be implemented. Network system 10 includes service provider network 20, which is communicatively coupled to customer networks 16A and 16B ("customer networks 16"). In turn, service provider network 20 includes routers 12A-12E ("routers 12"), which operate and interact with one another in accordance with the techniques described herein. To simplify the explanation and for purposes of example, the network devices of FIG. 1 will be referred to as "routers." However, the "routers" of FIG. 1 may perform other network device functions in addition to router functions, such as switching or other network functions. Routers 12 are communicatively coupled to one another, either directly, or indirectly, via physical links 14A-14E ("links 14"). Links 14 represent any physical medium, such as a copper wire, a coaxial cable, any of a host of different fiber optic lines, a wireless connection, and various combinations thereof. In the specific example of FIG. 1, routers 12A and 12C represent edge routers. More specifically, routers 12A and 12C provide an interface between service provider network 20 and respective customer networks 16.

Additionally, customer networks 16 include respective customer edge routers 17A and 17B ("CE routers 17"). As shown, each of CE routers 17 is linked to a respective edge router of routers 12. Edge routers 12A and 12C communicate with CE routers 17 to provide customer networks 16 with access to service provider network 20. As shown, each of customer networks 16 may be a network for a site of an enterprise. Each of customer networks 16 may include one or more computing devices (not shown), such as personal computers, laptop computers, handheld computers, workstations, servers, switches, printers, or other devices. Service provider network 20 may be coupled to one or more networks administered by other service providers and may thus form part of a large-scale public network infrastructure, e.g., the Internet. Consequently, customer networks 16 may be viewed as edge networks of the Internet.

The service provider may provide computing devices within customer networks 16 with access to the Internet via service provider network 20, which allows computing devices within one of customer networks 16 to communicate with computing devices within the Internet or the other one of customer networks 16. FIG. 1 may be a simplified view of network system 10. For instance, service provider network 20 can include a variety of other network devices (not shown), such as routers, switches, servers, and the like and may be connected to other networks.

In contrast to edge routers 12A and 12C, the remainder of routers 12 represents intermediate routers. More specifically, intermediate routers 12B, 12D, and 12E provide various communication channels between edge routers 12A and 12C. It will be appreciated that edge routers 12A and 12C also perform intermediate routing functionalities, as shown, for example, by the link that edge router 12A provides between intermediate routers 12B and 12E. Similarly, any of intermediate routers 12B, 12D, and 12E is capable of performing edge router functionalities by connecting to another device, such as an edge router of another network.

Routers 12 communicate in accordance with one or more control-plane protocols to maintain accurate representation of the topology of service provider network 20. For example, routers 12 maintain peering sessions with each other and exchange routing information for routes or links within service provider network 20 in accordance with a routing protocol. Example protocols include the Border Gateway Protocol (BGP) distance vector routing protocol and the Open Shortest Path First (OSPF) and Intermediate System-to-Intermediate System (IS-IS) link state routing protocols and other protocols.

In addition to exchanging session messages to convey network topology information, routers 12 periodically send status inquiries (e.g., send "periodic packets" or "periodic data") to one another in order to monitor the state of the other devices. That is, by sending periodic inquiries and detecting receipt of similar periodic inquiries, routers 12 detect any failures in communicating data between each other, either as a result of failure of one or more of routers 12 or of links 14 between them. Upon detecting such a failure, the detecting router 12 updates one or more internal representations of the topology of service provider network 20, and outputs session messages to the other routers 12 to inform the other routers 12 of the topology changes.

Typically, the length of time between which routers 12 transmit the periodic data or messages to one another correlates directly to the speed at which routers 12 detect any failure in communications between one another and thus update the respective representation of the topology of service provider network 20 to respond to the failure. For this reason, routers 12 are frequently configured to seek receipt of consecutive periodic inquiries within a relatively short length of time, e.g., within a few seconds or even in the order of milliseconds (ms).

Different protocols may be configured transmit (TX) periodic packets at different intervals, i.e., periodic intervals. Some protocols, such as Link Aggregation Control Protocol (LACP) include only specific periodic intervals. LACP, for example, includes a slow setting with a periodic interval of 30 seconds or a fast setting with a periodic interval of one second. Other protocols may be configured either by a user or by software to send periodic packets with intervals of different lengths. The bidirectional forwarding detection (BFD) protocol, for example, may set the periodic interval for each connection to any value between 1-25,500 milliseconds.

In a scaled environment, a variety of protocols may be operating to determine the health of the network, specifically its underlying connections and device liveness. In addition to BFD, LACP and OSPF, other protocols operating in a scaled networking environment may include Virtual Router Redundancy Protocol (VRRP), Connectivity Fault Management (CFM), which is described by IEEE 802.1ag, link fault management (LFM) or other similar operations, administration, and maintenance (OAM) tools. Therefore, a variety of periodic intervals for TX packets may be based on the different protocols or based on configurations for the routers in the networks.

Periodic packet management processing is responsible for the periodic transmission of packets on behalf of its various client processes, which include the processes that control the distributed periodic packet management protocols, such as LACP and BFD protocols, and also for receiving packets (RX) on behalf of client processes. For each protocol session, one TX session and one RX session are created. Periodic packet management processing also gathers some statistics and sends process-specific packets. In some examples, periodic packet management processing on a network device is distributed between the control plane (e.g., routing engine (RE)) and either the access interfaces or the line cards, depending on the particular network device, for all protocols that use periodic packet management by default. This distributed mode provides a faster response time for protocols that use periodic packet management than the response time provided by the non-distributed, or centralized mode in which periodic packet management processing is entirely carried out from the control plane. In the centralized mode, all TX and RX sessions are created on the control plane of the router, and all periodic packets are sent and received to or from the control plane. In the distributed mode, a periodic packet management process running on the line cards are responsible for managing the TX and RX sessions and sending and receiving the periodic packets.

As one example, BFD protocol may be used between two routing devices in order for each router to closely monitor the state (e.g., health) of the other routing device. For example, two of routers 12 that exchange routing information via the OSPF or ISIS routing protocols establish a BFD session, or other type of protocol session, for sending and responding to status inquiries in the form of Hello packets or Echo packets, either asynchronously or when needed. In either case, the selected protocol may be programmed to provide a short interval of time between which routers 12 must transmit periodic messages, and thus may facilitate the quicker detection of failures by routers 12 that are in an active protocol session.

Although described herein with reference to the BFD protocol, the techniques may apply to any protocol allowing for periodic messages for inquiring as to the status of a peering device. Further, the techniques may be applicable to routers 12 that use these periodic communications for media access control (MAC) layer protocols, such as the frame relay LMI, point-to-point (PPP) protocol. Moreover, the techniques further include instances where routers 12 employ one selected protocol in conjunction with any of the above protocols, as well as, protocols not contemplated herein. In these instances, routers 12 may employ a selected protocol for detecting failures and the other protocol for other routing functions, such as route resolution.

In the example of FIG. 1, various pairs of routers 12 exchange periodic messages in accordance with the selected protocol. The protocol session enables each of routers 12 to negotiate a periodic interval for each protocol session. In other words, router 12A may negotiate a protocol session 18A for link 14A with router 12B, and routers 12A, 12B may establish a 10 ms periodic interval for protocol session 18A in a first direction, which router 12A stores as an entry for a TX interval for protocol session 18A on link 14A (or the interface associated with link 14A). Router 12B also negotiates parameters in the opposite direction (not shown) with router 12A for protocol session 18A, which may have a different periodic interval, and router 12A stores as an entry for RX interval for protocol session 18A.

The time values used to determine protocol packet transmission intervals and the RX interval may be continuously negotiated by exchanging control packets, and thus may be changed at any time. The negotiation and time values are independent in each direction for each protocol session.

Each of routers 12A, 12B reports in the Control packet how rapidly it would like to transmit periodic packets, as well as how rapidly it is prepared to receive them. This allows either system to unilaterally determine the maximum packet rate (minimum periodic interval) in both directions.

Meanwhile, router 12A may negotiate a further BFD session 18B with router 12D for a connection between them. In this example, routers 12A and 12D may establish a response interval of 100 ms for protocol session 18B in a first direction. Router 12D also negotiates parameters in the opposite direction with router 12A, which may have a different periodic interval, which router 12A stores as an RX interval for the connection to router 12D. In some examples the network devices, such as routers 12, may estimate how quickly each network device can send and receive periodic packets to peer network devices as part of the negotiation process.

As illustrated through the example of router 12A, a single router may participate in multiple protocol sessions, even if the protocol sessions have different attributes. Each of routers 12A, 12B, and 12D execute one or more BFD timers. For example, each of routers 12A, 12B, and 12D executes a transmission timer (TX timer) and a detection (or "adjacency") timer (RX timer).

Each protocol session may therefore include two entries for the particular periodic packet management mode that is managing the periodic packets for that session. For example, considering router 12B to be the "local router," then router 12B may negotiate a number of protocol sessions with any of the peer routers in service provider network 20. For a first protocol session, local router 12B may store entries for a TX periodic interval and an RX periodic interval, which may or may not be of the same length. When the first protocol session is managed using inline mode, the ASIC inline hardware table may include an entry for the TX periodic interval for the first protocol session and a second entry for the RX periodic interval for the first protocol session. If the ASIC inline hardware table is full and can take no further entries, either or both of the entry for the TX periodic interval and the RX periodic interval may be managed in distributed mode. In some examples the TX periodic interval may be referred to as the "xmit" interval.

The techniques of this disclosure dynamically and selectively exchange entries for negotiated periodic packet communication sessions so that entries with the shortest periodic intervals, whether a TX periodic interval or an RX interval, are handled using the most efficient mode, i.e. inline mode, distributed mode or centralized mode. The techniques of this disclosure will move the entries with the shortest periodic intervals to be handled at the hardware level, while entries with the longer intervals can be handled at the software/firmware level, such as distributed mode.

The techniques of this disclosure may provide an advantage over simply assigning entries to inline mode or distributed mode based on when the protocol session was negotiated relative to other, earlier established sessions. In other words, in examples in which the ASIC inline hardware table is full, rather than just assigning any new TX or RX entries for a new negotiated session to distributed mode, in accordance with the techniques of this disclosure a router 12 is configured to dynamically compare the periodic intervals for the various entries, and swap shorter intervals to be handled at the hardware level, regardless of when the session for that entry was negotiated. Also, as noted above, though this example focused on BFD to simplify the discussion, the concepts apply equally to any protocol used in a scaled environment, unless otherwise noted.

Each of routers 12 may also negotiate a device-specific transmit interval. In other words, the TX periodic interval can vary for each router 12 of protocol session 18B. For instance, during protocol session 18B, router 12D may transmit a BFD packet every 10 ms, while router 12A may transmit a BFD packet every 15 ms. In turn, router 12A may implement a BFD adjacency timer with a RX periodic interval of 10 ms, and router 12D may implement a BFD adjacency timer with a RX periodic interval of 15 ms. This notion of device-specific intervals explains the "bidirectional" or "B" of the "BFD" protocol, as the periodic messages can be controlled differently in each direction.

Data traffic over service provider network 20 may vary at different times. As one example, devices of customer networks 16 may transmit and elicit high volumes of data over service provider network 20 during business hours of a weekday. Conversely, customer networks 16 may cause substantially lighter traffic over service provider network 20 during non-business hours. The condition of transport delays due to heavy data traffic is referred to herein as "congestion."

In some examples, a user may manually adjust the periodic interval for an entry. The techniques of this disclosure provide for dynamically and selectively comparing the adjusted periodic interval to other entries and moving the entry to or from inline mode as appropriate. For example, a change to the TX interval for a local router, but also a change to a TX interval at a peer router will cause a change in the corresponding RX interval at the local router.

Changes in the periodic interval may result in a situation in which an entry in an ASIC inline hardware table may be better suited to be managed in distributed mode rather than by inline mode. In an example of a change in periodic interval for an entry in an ASIC inline hardware table, the techniques of this disclosure may dynamically and selectively compare the updated periodic interval to other entries in the ASIC inline hardware table as well as to entries managed by software in distributed mode. If the ASIC inline hardware table is full, then dynamically changed periodic intervals that become longer may be moved from inline mode to distributed mode. Similarly, changed periodic intervals that become shorter may be moved to inline mode. To add an entry to a full ASIC inline hardware table, the lowest priority entry in the ASIC inline hardware table would be deleted from the hardware table and moved to distributed mode to make room to add a new inline entry.

Figure 2:
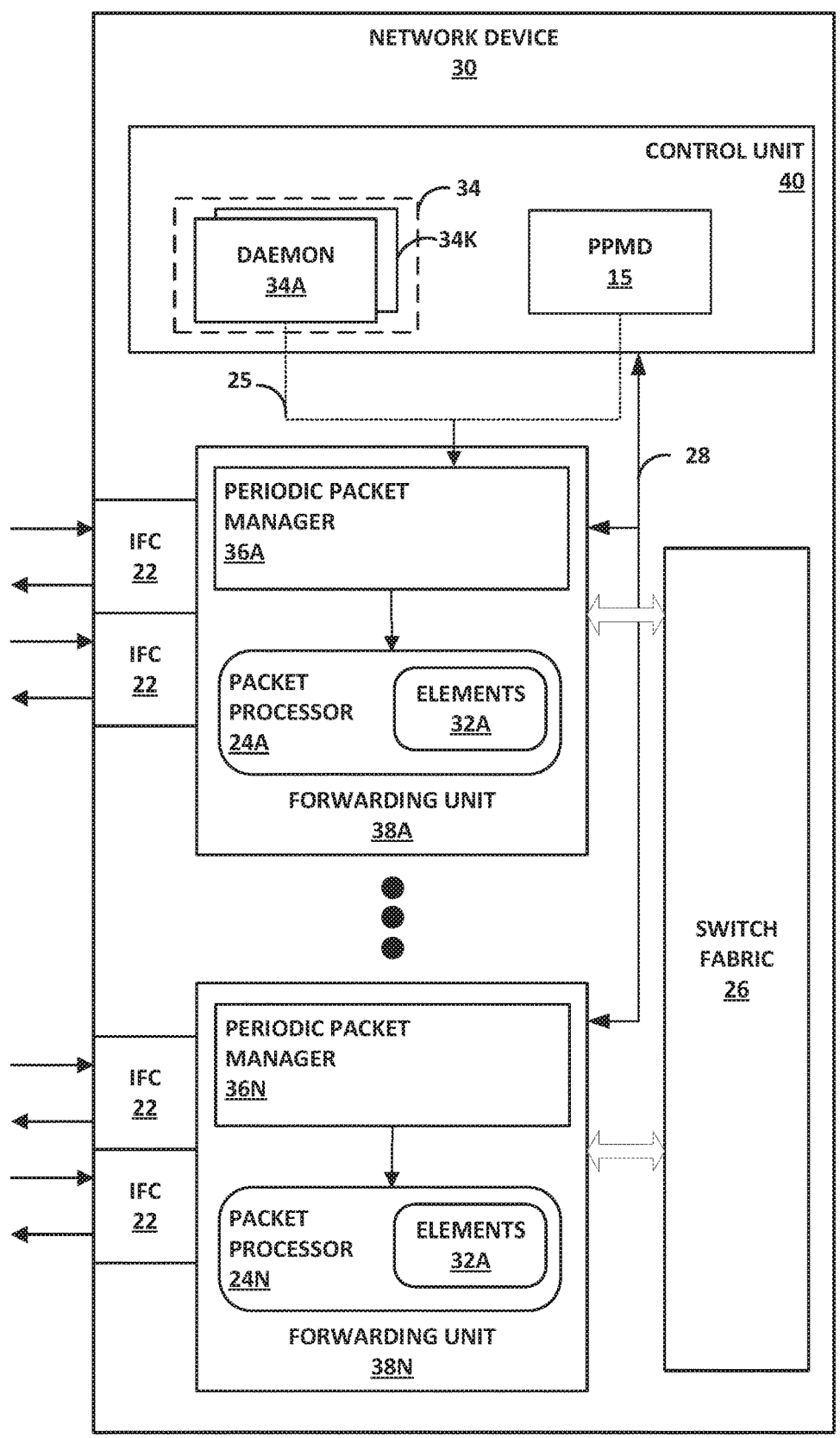
FIG. 2 is a block diagram illustrating an example of a network device in accordance with the one or more techniques of this disclosure.

FIG. 2 is a block diagram illustrating further details of a network device that implements the different modes of periodic packet management, in accordance with one or more aspects of this disclosure. Network device 30 may include a router such as a provider edge or customer edge router, a core router, or another type of network device, such as a switch, a network device having both routing and switching functionality, or other network device. As described above in relation to FIG. 1, examples of a provider edge router may include edge routers 12A and 12C. Similarly, examples of customer edge routers may include CE routers 17.

In this example, network device 30 includes a control unit 40 that provides control plane functionality for the device. Network device 30 also includes a plurality of forwarding units 38A-38N ("forwarding units 38") and a switch fabric 26 that together provide a data plane for processing network traffic. Forwarding units 38 receive and send data packets via interfaces of interface cards 22A-22N ("IFCs 22") each associated with a respective one of forwarding units 38. Each of forwarding units 38 and its associated ones of IFCs 22 may represent a separate line card insertable within a chassis (not shown) of network device 30. Example line cards include flexible programmable integrated circuit (PIC) concentrators (FPCs), dense port concentrators (DPCs), and modular port concentrators (MPCs). Each of IFCs 22 may include interfaces for various combinations of layer two (L2) technologies, including Ethernet, Gigabit Ethernet (GigE), and Synchronous Optical Networking (SONET) interfaces, that provide an L2 interface for transporting network packets. In various aspects, each of forwarding units 38 may include more or fewer IFCs. Switch fabric 26 provides a high-speed interconnect among forwarding units 38 for forwarding incoming data packets to an egress forwarding unit of forwarding units 38 for output over a network that includes network device 30.

Control unit 40 is connected to each of forwarding units 38 by internal communication links 28. Internal communication links 28 may include a 100 Mbps Ethernet connection, for instance. Control unit 40 configures, by sending instructions and other configuration data via internal communication link 28, forwarding units 38 to define packet processing operations applied to packets received by forwarding units 38.

Control unit 40 executes a plurality of applications, including daemons 34A-34K ("daemons 34") and one or more other applications include distributed periodic packet manager (PPMD) 15. Each of the applications may represent a separate process managed by a control unit operating system. In some examples PPMD 15 may be implemented as a daemon and included as one of daemons 34. A daemon is a type of program that runs unobtrusively in the background, rather than under the direct control of a user. In some examples, a daemon may wait to be activated by the occurrence of a specific event or condition.

Daemons 34 may represent user-level processes that are developed and deployed by the manufacturer of the network device 30. As such, daemons 34 are "native" to the network device 30 in that the development of the applications is carefully managed by the manufacturer to facilitate secure, robust, and predictable operation of the network device 30, such operation defined at least in part according to a configuration specified by an operator (e.g., a service provider, enterprise, or other customer of the network device 30 manufacturer). Daemons 34 may accommodate requests for services from other computers on a network, as well as respond to other programs and to hardware activity. Daemons 34 may run network management software, execute routing protocols to communicate with peer routing devices, maintain and update one or more routing tables, and create one or more forwarding tables for installation to forwarding units 38, among other functions.

Control unit 40 may include one or more processors (not shown in FIG. 2) that execute software instructions, such as those used to define a software or computer program, stored to a computer-readable storage medium (again, not shown in FIG. 2), such as non-transitory computer-readable mediums including a storage device (e.g., a disk drive, or an optical drive) and/or a memory such as random-access memory (RAM) (including various forms of dynamic RAM (DRAM), e.g., DDR2 SDRAM, or static RAM (SRAM)), Flash memory, another form of fixed or removable storage medium that can be used to carry or store desired program code and program data in the form of instructions or data structures and that can be accessed by a processor, or any other type of volatile or non-volatile memory that stores instructions to cause the one or more processors to perform techniques described herein. Alternatively, or in addition, control unit 40 may include dedicated hardware, such as one or more integrated circuits, one or more Application Specific Integrated Circuits (ASICs), one or more Application Specific Special Processors (ASSPs), one or more Field Programmable Gate Arrays (FPGAs), or any combination of one or more of the foregoing examples of dedicated hardware, for performing the techniques described herein. Control unit 40 may also be referred to as the routing engine (RE) of network device 30.

The module in an individual router that is responsible for the periodic packet exchange protocol may be called periodic packet management (PPM) module or daemon. The periodic packet management may manage the layer two (data link) and layer three (network) protocols. The periodic packet management may function in three different modes: (a) centralized mode, (b) distributed mode and (c) inline mode. In each of the modes, a local router may establish a member interface, also called an entry, with each peer router. Each entry may include a TX and an RX section. The TX section controls the sending of periodic packets to the peer router. The RX section monitors packets received from the peer router. In centralized mode, all the TX and RX packets are managed by the control plane, such as by PPMD 15, by a routing protocol daemon, or by another control plane process.

In the example of FIG. 2, PPMD 15 is the program configured to manage periodic packets at control unit 40. In some examples, PPMD 15 performs negotiation with peer network devices, such as routers 12 in network 10 described above in relation to FIG. 1. PPMD 15 may base the negotiation on any one or more of the variety of protocols operating within a network, such as BFD, LACP and so on. In other examples, protocols 48 negotiate the session parameters and provide the periodic interval information to PPMD 15. In some examples, PPMD 15 may manage one or more protocol sessions with a peer network device of network device 30, in which each protocol session has a TX periodic interval and an RX periodic interval, as described above in relation to FIG. 1. For example, PPMD 15 may manage a TX periodic interval with an adjacent peer router that is set to one second. PPMD 15 may also manage, based on the response from the peer router, the RX periodic interval for that protocol session that is set to three seconds. PPMD 15 may assign the management of the TX periodic interval and the RX periodic interval in any one of inline mode, distributed mode or centralized mode. PPMD 15 may be configured to select the most efficient mode based on the length of the periodic interval compared to the periodic intervals (either TX or RX) for other communication sessions established by network device 30.

In addition to processing the periodic packets used to determine the status of network connections or devices, each forwarding unit of forwarding units 38 includes at least one packet processor 24 that processes packets by performing a series of operations on each packet over respective internal packet forwarding paths as the packets traverse the internal architecture of network device 30. Packet processor 24A of forwarding unit 38A, for instance, includes one or more configurable hardware chips (e.g., a chipset) that, when configured by applications executing on control unit 40, define the operations to be performed by packets received by forwarding unit 38. Each chipset may in some examples represent a "packet forwarding engine" (PFE). Each chipset may include different chips each having a specialized function, such as queuing, buffering, interfacing, and lookup/packet processing. Each of the chips may represent application specific integrated circuit (ASIC)-based, field programmable gate array (FPGA)-based, or other programmable hardware logic. A single forwarding unit 38 may include one or more packet processors 24.

Packet processors 24 also include forwarding path elements 32, which, in some examples, include instructions executable by respective packet processors 24 that may be stored at a memory of packet processors 24 (not shown in FIG. 2). In some examples, forwarding path element may be a chipset, such as an ASIC, which may include the inline hardware table described above in relation to FIG. 1 (not shown in FIG. 2). Once a periodic packet entry has been programmed into an inline entry on the hardware table of the ASIC, the ASIC may manage the periodic packets without the need to use resources from the associated forwarding unit 38 or from the control plane, i.e., control unit 40.

Another advantage of the inline mode is that it is useful during an in-service software upgrade to the local router, for example updating the router to the next software image, particularly in the case of a dual routing engine system. In a dual RE system (e.g., two control units), in-service software upgrade happens in multiple phases. First the backup RE software is upgraded and restarted. After that, the master RE software is upgraded. Then LC/FPC gets upgraded in multiple phases. After that, the backup becomes new master and the master is restarted with new software and becomes the backup. During LC/FPC upgrade, if entries are not inlined then the dark window may cross a periodic packet timeout period. The dark window is a traffic outage or time interval where a peer network device is not getting a periodic update, in some examples because some resources may not be available. A dark window can happen because a TX path from the PPM module to the ASIC (in hardware) is not yet ready. But because the inline entries are in the ASIC there is no such issue.

Put another way, during the Line card/FPC upgrade, the dark window may take more time than the timeout value, and the session may flap. But if the entries are inlined in the ASIC, e.g., in a hash table in the forwarding path 66A of packet processor 24A, then this session flap can be avoided. In the example of a higher priority entry, the periodic TX interval may be approximately one second with a timeout interval of approximately three seconds (for example, for the LACP protocol). For other protocols, the TX interval and timeout values may be different. In this case, it is possible the timeout will occur before the in-service software upgrade completes, so an aggregated interface will "flap," which can cause an outage.

Packet processors 24 execute the forwarding path elements 32 to process received packets to satisfy the high-level packet processing requirements provided by the application. In this way, the applications inject higher-level representations of routes and next-hops (operations) into the stream of configurable forwarding state that is stored by packet processors and that defines, at least in part, the packet processing operations for execution by packet processors 24. Because forwarding path elements 32 may resolve to other forwarding path elements 32, forwarding path elements 32 may be chained together to define a set of packet processing operations for a given packet and form a "forwarding path" for that packet. The set of forwarding path elements 32 and forwarding state for execution and use by packet processors 24 may therefore alternatively be referred to as the forwarding path or internal forwarding path for a given packet processor 24, forwarding unit 38, or the network device 12 as a whole.

Each forwarding unit of forwarding unit 38 also includes a periodic packet manager (PPM) 36. PPM 36 may manage the periodic packets assigned to a forwarding unit 38 by PPMD 15. In some examples, some functions of PPMD 15 may be handled by one or more of PPMs 36. In other examples, PPMD 15 may perform most or all of the periodic packet management functions described herein. The configuration for any network device may be set by the manufacturer of the network device and/or the user or administrator for the network device. In some implementations, PPM mode configuration is per protocol, but this is not required for the techniques of this disclosure. For example, PPMD 15 may assign one or more portions (i.e., the TX portion or the RX portion) of a negotiated protocol session as an entry to an inline hardware (HW) table resident on a chipset of a forwarding unit. If the inline hardware table is full, i.e., the inline hardware table has no space available to list an entry for a portion of a session, then PPMD 15 may be configured to assign the one or more portions as an entry to be managed by the distributed mode of the forwarding unit, e.g., forwarding unit 38A.

As described above in relation to FIG. 1, the inline mode may be the more efficient mode of periodic packet management. The techniques of this disclosure dynamically and selectively compare the periodic intervals for the various entries and swap entries with shorter intervals to be handled at the hardware level where appropriate, regardless of when the session for that entry was negotiated. As new entries are negotiated, or if there is a change to the periodic interval for a current entry, the techniques of this disclosure dynamically compare the new or changed entry to other entries and move entries between modes. In other words, entries with more frequent packets (shorter periodic intervals) may be managed as entries in the inline hardware table. Entries with less frequent packets (longer periodic intervals) may be managed as entries in distributed mode by PPM 36A-36N, as assigned by PPMD 15 or by control unit 40 in centralized mode.

Figure 3:
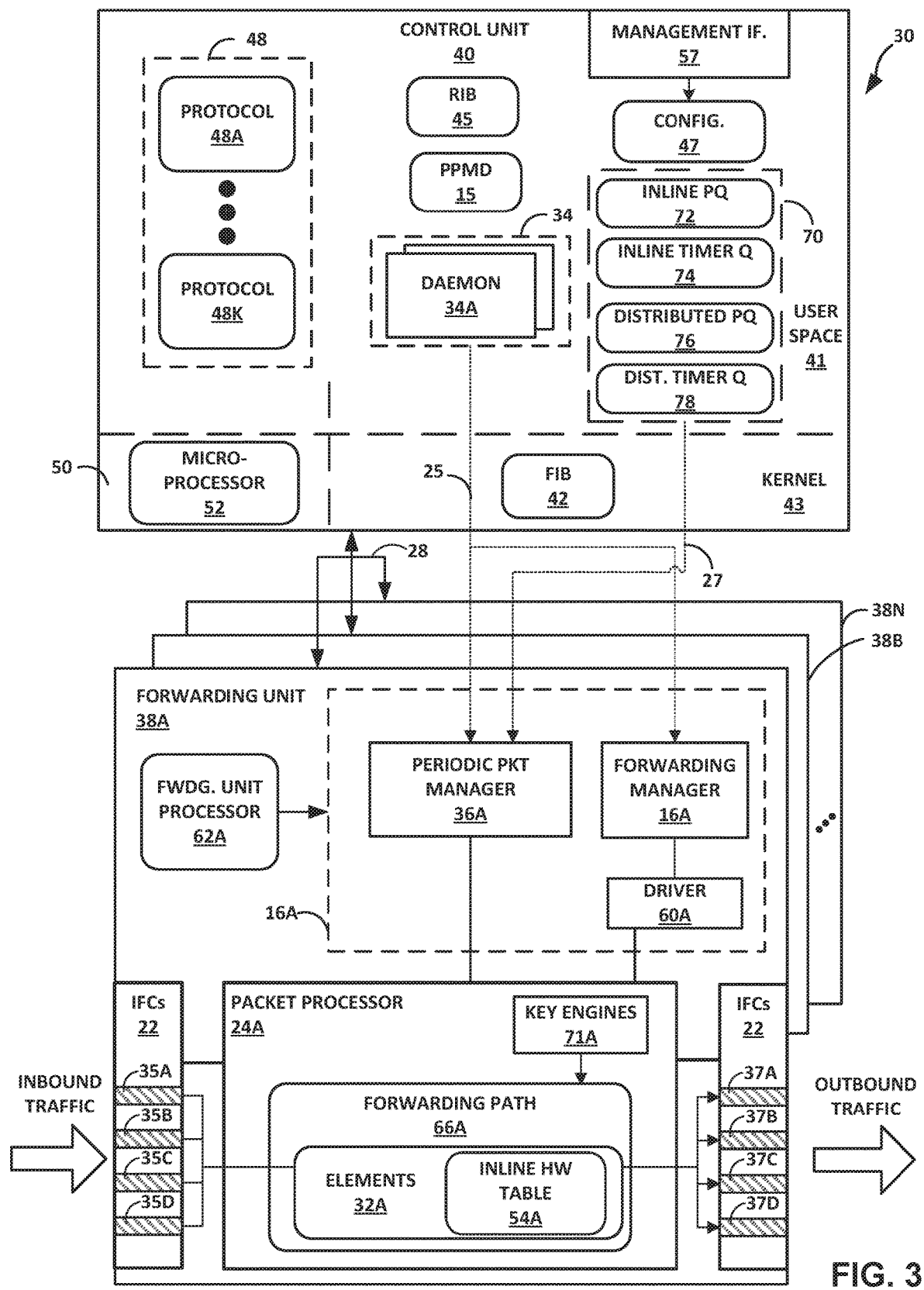
FIG. 3 is a block diagram illustrating further details of a network device that implements the different modes of periodic packet management, in accordance with one or more aspects of this disclosure.

FIG. 3 is a block diagram illustrating, in further detail, an example network device in which a forwarding unit is configured, according to techniques described herein. Network device 30 illustrated in FIG. 3 may represent an example instance of network device 30 of FIG. 2. Elements with the same reference numbers in FIG. 3 as depicted in FIG. 2 have the same function and characteristics, for example data 25, 27 and internal communication links 28.

In this example, control unit 40 includes a combination of hardware and software that provides a control plane operating environment for execution of various user-level host applications executing in user space 41. By way of example, host applications may include a management interface process 57 having a command-line interface and/or graphical user interface process to receive and respond to administrative directives, a routing protocol process of daemons 34 to execute one or more routing protocols of protocols 48A-48K (collectively, "protocols 48"), a network management process of daemons 34 to execute one or more network management protocols of protocols, an ARP process of daemons 34 to respond to ARP requests according the ARP protocol of protocols 48, a subscriber management process of daemons 34 to manage subscriber session setup and maintenance in accordance with one or more subscriber session management protocols (e.g., GPRS Tunneling Protocol-C (ontrol)), and so forth. In this respect, control unit 40 may provide routing plane, service plane, and management plane functionality for network device 30. Control units 40 may be distributed among multiple control units.

One or more of protocols 48 include periodic packet management, as described above in relation to FIGS. 1 and 2. Some examples of protocols 48 may include BFD, LACP, OSPF, VRRP, CFM, LFM, or other protocols operating in a scaled networking environment. PPMD 15 depicted in FIG. 3 is an example of PPMD 15 described above in relation to FIG. 2. Though shown as a separate portion of control unit 40, in some examples, PPMD 15 may be implemented as one of daemons 34.

Daemons 34 and management interface 57 execute on and interact with kernel 43, which provides a run-time operating environment for user-level processes. Kernel 43 may represent, for example, a UNIX operating system derivative such as Linux or Berkeley Software Distribution (BSD). Kernel 43 offers libraries and drivers by which user-level processes may interact with the underlying system. Hardware environment 50 of control unit 40 includes microprocessor 52 that executes program instructions loaded into a main memory (not shown in FIG. 3) from a storage device (also not shown in FIG. 3) in order to execute the software stack, including both kernel 43 and user space 41, of control unit 40. Microprocessor 52 may represent one or more general- or special-purpose processors such as a digital signal processor (DSP), an application specific integrated circuit (ASIC), a field programmable gate array (FPGA), or any other equivalent logic device. Accordingly, the terms "processor" or "controller," as used herein, may refer to any one or more of the foregoing structures or any other structure operable to perform techniques described herein.

In this example, a routing protocol process of daemons 34 executes one or more interior and/or exterior routing protocols to exchange routing information with other network devices and store received routing information in routing information base 45 ("RIB 45"). RIB 45 may include information defining a topology of a network, including one or more routing tables and/or link-state databases. The routing protocol process resolves the topology defined by routing information in RIB 45 to select or determine one or more active routes through the network and then installs these routes to forwarding information base 42 ("FIB 42") of kernel 43. Typically, the routing protocol process generates FIB 42 in the form of a radix or other lookup tree to map packet information (e.g., header information having destination information and/or a label stack) to next hop devices and ultimately to interface ports of interface cards associated with respective forwarding units 38A-38N. Each of forwarding units 38 may be programmed with a different FIB. As described above in relation to FIGS. 1 and 2, control unit 40 may employ periodic packets managed by PPMD 15 to determine the health of the links and routes in the topology of the network.

Network device 30 also includes a plurality of forwarding units 38A-38N (collectively, "forwarding units 38") and a switch fabric (not shown) that together provide a data plane for forwarding network traffic. Forwarding units 38 connect to control unit 40 in this example by communication links 23, which may represent an Ethernet network.

Each of forwarding units 38 may include substantially similar components performing substantially similar functionality, said components and functionality being described hereinafter primarily with respect to forwarding unit 38A illustrated in detail in FIG. 3. Forwarding unit 38A of FIG. 3 may illustrate, in further detail, an example of forwarding unit 38A of FIG. 1. Forwarding unit 38A receives and sends network packets via inbound interfaces 35 and outbound interfaces 37, respectively, of interface cards (IFCs) 22 of forwarding unit 38A. Forwarding unit 38A also includes packet processor 24A, which represents hardware or a combination of hardware and software that provide high-speed forwarding of network traffic. Likewise, forwarding unit 38B includes packet processor 24B, and so on. In some examples, one or more of forwarding units 38 may each include multiple packet processors substantially similar to packet processor 24A.

Each of IFCs 22 may include interfaces for various combinations of layer two (L2) technologies, including Ethernet, Gigabit Ethernet (GigE), and Synchronous Optical Networking (SONET) interfaces. In various aspects, each of forwarding units 38 may include more or fewer IFCs. In some examples, each of packet processors 24 is associated with different IFCs of the forwarding unit on which the packet processor is located. The switch fabric (again, not shown in FIG. 3) connecting forwarding units 38 provides a high-speed interconnect for forwarding incoming transit network packets to the selected one of forwarding units 38 for output over one of IFCs 22.

Network device 30 may in some instances represent a multi-chassis router, and the switch fabric may include a multi-stage switch fabric, such as a 3-stage Clos switch fabric, that relays packet-switched communications and circuit-switched communications between the routing nodes of the multi-chassis router via optical interconnects using multiplexed communications. Such a multi-chassis router that employs optical interconnects using multiplexed communications is described in U.S. Publication No. 2008/0044181, entitled MULTI-CHASSIS ROUTER WITH MULTIPLEXED OPTICAL INTERCONNECTS, filed on Aug. 1, 2007, the entire contents of which are incorporated by reference herein.

Forwarding units 38A-38N of network device 30 demarcate control plane and data plane of network device 30. That is, forwarding unit 38A performs both control plane and data plane functionality. In general, packet processor 24A and IFCs 22 implement a data plane for forwarding unit 38A, while forwarding unit processor 62A (illustrated as "fwdg. unit processor 62A") executes software including periodic packet manager 36A and packet processor driver 60A that implement portions of the network device 30 control plane within forwarding unit 38A. Control unit 40 also implements portions of the control plane of network device 30. Forwarding unit processor 62A of forwarding unit 38A manages packet processor 24A and executes instructions to provide interfaces to control unit 40 and handle host-bound or other local network packets (such as packets that include Options Field values or TTL-expired packets).

Packet processor 24A may include programmable ASIC-based, FPGA-based, or other types of packet processors that process network packets by performing a series of operations on each packet over respective internal packet forwarding paths as the packets traverse the internal architecture of network device 30. Packet processor 24A includes forwarding path elements 32A that, in some examples, when executed, examine the contents of each packet (or another packet property, e.g., incoming interface) and on that basis make forwarding decisions, apply filters, and/or perform accounting, management, traffic analysis, and load balancing, for example. In one example, packet processor 24A arranges forwarding path elements as next hop data that can be chained together as a series of "next hops" along an internal packet forwarding path 66A ("forwarding path 66A") for the packet processor 24A. The result of packet processing determines the manner in which a packet is forwarded or otherwise processed by packet processors 24 of forwarding units 38 from the packet's input interface on an ingress forwarding unit of forwarding units 38 to its output interface on an egress forwarding unit of forwarding units 38.

Packet processor 24A identifies packet properties and performs actions bound to the properties. One or more key engines 71A of packet processor 24A execute microcode (or "microinstructions") of the forwarding path elements to control and apply fixed hardware components of the forwarding path to process packet "keys." A packet key includes packet fields and other parameters that determine a flow of packet processing for the packet along an internal forwarding path. Internal forwarding path 66A ("forwarding path 66A") may represent a computer-readable storage medium, such as random access memory, and includes forwarding path elements in the form of programmable, executable microcode and fixed hardware components that determine the packet processing actions and other operations performed by packet processor 24A. Forwarding path 66A may include, for example, executable instructions, programmable logic, and application-specific logic that perform lookups, rate limit packet flows (e.g., using policers), and manipulate packet keys, among other functions. Forwarding path elements may include primitives such as lookup tables and lookup trees, along with rate limiters, policers, counters, firewalls, and other elements.

Internal forwarding paths of network device 30 may include combinations of respective forwarding paths 66 of multiple different packet processors 24. In other words, forwarding path 66A of packet processor 24A may include only a part of the overall internal forwarding path of network device 30. Control unit 40 may configure forwarding path 66A of packet processor 24A to identify host-bound network packets and forward such packets toward control unit 40. For example, control unit 40 may program filters that include a network address of a network device 30 and direct packet processor 24A to forward network packets having a destination address that matches the network address toward control unit 40.

In some examples, packet processor 24A binds actions to be performed on packets received by the packet processor 24A to identification of one or more properties of the packets. That is, upon identifying certain packet properties, packet processor 24A performs the action bound to the properties. Packet properties may include packet metadata such as a particular packet's ingress interface or egress interface (as determined by the packet processors 24) as well as information carried by the packet and packet header, such as packet header fields, destination route prefixes, layer four (L4) or Transport Layer protocol destination ports, and the packet payload. Actions bound to packet characteristics may include count, discard, forward to a specified forwarding path element or interface, filter, sample, rate limit, and Quality of Service (QoS) marking, differential services (DiffServ), load balance, intrusion detection and prevention, L2 class of service (CoS), and L2 or L2 Virtual Private Network (L2VPN) switching.

Each of key engines 71A includes one or more key buffers to store packet field data for corresponding packets that the key engine is currently processing. Key buffers may also provide limited writable memory to which elements of the internal forwarding path may write to pass messages accessible by future elements.

Forwarding path elements 32A (also referred to as "primitives") of forwarding path 66A include data structures having entries, or "items," that correspond to packet key values and bind the values to actions to be performed by key engines 71A executing forwarding path 66A. In this respect, at least some of forwarding path elements 32A represent a tightly-coupled combination of executable instructions that correspond to bound actions and of data for possible packet key values. A tree lookup one of forwarding path elements 32A may perform a longest-match prefix lookup in a routing table or search a list of prefixes in a filter program. A table lookup one of forwarding path elements 32A may determine whether another one of forwarding path elements 32A should be performed by key engines 71A. For example, a key engine 71A may perform a table lookup of packet properties to determine that key engines 71A should further perform a tree lookup to identify an outbound interface for the packet. Packet processor 24A may store forwarding path elements 32A in computer-readable storage media, such as static random access memory (SRAM). While illustrated within packet processor 24A, forwarding path elements 32A may be stored in memory external and accessible to packet processor 24A.

Elements 32A may also include inline HW table 54A. In the example in which packet processor 24A is implemented as an ASIC, inline HW table 54A may be referred to as ASIC inline HW table 54A. In some examples inline HW table 54A may be implemented as a hash table. Inline HW table 54A includes entries for periodic packets that are operating under inline mode. As described above in relation to FIGS. 1 and 2, entries in inline HW table 54A may be entries with more frequent (shorter periodic intervals) when compared to other periodic packets used to determine the health of a network. Depending on the configuration of packet processor 24A inline HW table 54A may be limited to a specific number of entries. Some examples of the size of inline HW table 54A may include 16K, 32K, 64K or other sizes. For a network device with a large number of negotiated links with peer routers, the inline hardware tables 54A-54N may not be large enough to include entries for all the negotiated links. If an inline HW table for a forwarding unit, e.g. inline HW table 54A, is full and PPMD 15 assigns more entries to forwarding unit 38A than there is space available in the HW table, then the entry will be managed in distributed mode by software executing on forwarding unit processor 62A, e.g., periodic packet manager 36A.

In some examples, a technique to compare the periodic interval of one entry to the periodic interval of other entries includes creating a node in a priority queue (PQ) for each entry, with the priority set based upon the length of the periodic interval. For example, some of the entries managed in distributed mode may also be assigned a corresponding node in distributed priority queue 76 (depicted as "distributed PQ 76" in FIG. 3). In some examples, not all distributed entries will have a node in the distributed priority queue; rather, only those distributed entries which are configured as inline but do not get programmed to the inline hardware table because the inline hardware table is full may be assigned a corresponding node in the distributed priority queue. A priority queue is a data type which is like a regular queue or stack data structure, but where additionally each element has a "priority" associated with it. In a priority queue, an element with high priority is served before an element with low priority. In some implementations, if two elements have the same priority, they are served according to the order in which they were enqueued, while in other implementations, ordering of elements with the same priority is undefined.

In distributed priority queue 76, the head node is the node for which the corresponding entry has the shortest periodic interval when compared to other nodes in distributed priority queue 76. In some examples, for distributed entries with the same periodic interval, the priority may be based on the time that the entry is assigned to a node in distributed priority queue 76. In other examples, sorting nodes in distributed priority queue 76 may depend on other factors, such as the type of protocol used, which peer router corresponds to the entry or other criteria.

Similarly, each actual entry in inline HW table 54A is assigned a corresponding node within inline priority queue 72 (depicted as "inline PQ 72" in FIG. 3). Other entries with the inline HW tables of forwarding units 38A-38N may also be assigned nodes within inline priority queue 72. In contrast to the criteria for distributed priority queue 76, the head node for inline priority queue 72 based on the longest periodic interval for the corresponding entry in the HW inline table. Sorting nodes with the same periodic interval within inline priority queue 72 may be similar to that described above for distributed priority queue 76

In operation, when PPMD 15 manages a new periodic packet entry, for example, for a newly negotiated protocol session with a peer network device of network device 30, PPMD 15 may attempt to add the new periodic packet entry, or entries to an inline HW table such as inline HW table 54A. A newly negotiated protocol session will have a periodic packet entry for the TX periodic packet and an entry for the RX periodic packet. The periodic interval for the TX periodic packet session may be different for the RX periodic packet session. As described above in relation to FIGS. 1 and 2, the concepts may apply equally to the various types of periodic packet protocols.

If there is no space available in an inline HW table, PPMD 15 may compare the periodic interval for the new entry to the periodic interval of the head node of inline priority queue 72. If the periodic interval for the new entry is less than the periodic interval for the head node of inline priority queue 72, then PPMD 15 may cause either microprocessor 52, or one of forwarding unit processors 62, to swap the new entry for the entry within an inline HW table 54 corresponding to the head node of inline priority queue 72. The entry swapped out of one of inline HW table 54 will be added as an entry to be managed in the distributed mode of operation, and a node created in distributed priority queue 76 for the swapped entry. In this manner, the techniques of this disclosure dynamically move the shortest periodic intervals to be managed by the inline mode of operation which may improve the efficiency of periodic packet management for network device 30.

Alternatively, in other examples, when there is no space available in an inline HW table, PPMD 15 may add the new entry to operate under distributed mode and add a node in distributed priority queue 76 for the new entry, because its periodic interval is greater than the inline HW table's priority queue head node periodic interval. In some examples, the new entry may have a shorter periodic interval than any other entry in distributed priority queue 76, so the new entry may become the head node of distributed priority queue 76. PPMD 15 may also include a periodic priority comparison timer to compare the head node of distributed priority queue 7 to the head node of inline priority queue 72. Each time the priority comparison timer expires, PPMD 15 checks whether the periodic interval for the head node of distributed priority queue 76 is less than the periodic interval for the head node of inline priority queue 72. If the periodic interval for the head node of inline priority queue 72 is less than the periodic interval for the head node of distributed priority queue 76, then PPMD 15 may reset the priority comparison timer and take no further action.

When the periodic interval for the head node of inline priority queue 72 is less than the periodic interval for the head node of distributed priority queue 76, PPMD 15 may cause one or more processors of network device 30 to execute instructions to create an entry to operate under distributed mode for the actual entry to be deleted from one of inline HW tables 54. PPMD 15 may cause the swap of the actual entry for shorter periodic interval into one of inline HW tables 54, then update each of distributed priority queue 76 and inline priority queue 72 by adding nodes corresponding to the new entries, according to the priority rules for each priority queue.

In some examples, queues 70 may also include inline timer queue 74 (depicted as "inline timer Q" 74) and distributed timer queue 78 (depicted as "dist. timer Q" 78). In other examples, inline timer queue 74 and distributed timer queue 78 may not be used as part of periodic packet management for network device 30.

Inline timer queue 74 and distributed timer queue 78 may be useful to prevent undesired "churning" of entries between distributed mode and inline mode. In general, when a new entry is added to distributed mode, or to one of inline HW tables 54 to be managed by inline mode, a node corresponding to the new entry is added to the corresponding timer queue. In the example of the swap described above, for the entry deleted from inline HW table 54 and added as a distributed mode entry, microprocessor 52, for example, may create a node in distributed timer queue 78 corresponding to the added distributed mode entry. The node in distributed timer queue 78 then starts a timer for a predetermined period of time. Until that timer expires, microprocessor 52 may be inhibited from performing further swap operations for the entry corresponding to the node in distributed timer queue 78. When the predetermined time expires for the timer queue node, microprocessor 52 deletes the node from distributed timer queue 78 and creates a node distributed priority queue 76. However, regardless of whether the timer for the timer queue node has expired, the actual entry may continue to process (TX or RX) periodic packets in distributed mode. The predetermined time for the node in distributed timer queue 78 may be a preset time, e.g., five seconds, or may be dynamically determined based on a variety of factors, the periodic interval for the entry, the protocol used for the entry and other factors.

Though depicted as resident on the memory of control unit 40, some or all of queues 70 may be resident on and managed by forwarding units 38. Some of the functions described above as performed by PPMD 15 may be performed by one or more of periodic packet managers 36 on forwarding units 38. Priority queues and timer queues may be implemented using a variety data structures such as arrays, linked-lists, heaps and binary trees. In the example of a linked list then top of priority queue will be head node (or just "head") of list. For convenience, the terms "head" or "head node" will be used in this disclosure regardless of which data structure may be used for queues 70. Similarly, the term "nodes" in this disclosure also mean members of other types of data structures, such as heaps, arrays, and so on.

In some aspects, actions of forwarding path 66 use a forwarding path element data structure to initiate processing. At the end of each processing step by one of key engines 71A, such as execution of one of a forwarding path element 32A, the result is a forwarding path element that may specify additional processing or the termination of processing, for instance. In addition, forwarding path elements may specify or otherwise represent one or more functions to be executed by key engines 71A. Example forwarding path element functions include policing (i.e., rate limiting), counting, and sampling. Forwarding path elements thus form the primary data structure that can be used to initiate a lookup or another forwarding path element, chain lookups and forwarding path elements together to allow for multiple lookup and other operations to be performed on a single packet and terminate a lookup. Key engines 71 may be associated with respective result (or "lookup") buffers that store results for executing forwarding path elements. For example, a key engine 71 may execute a lookup specified by a forwarding path element and store the result of the lookup to the associated result buffer. The contents of a result buffer may affect the actions of the forwarding path element in the forwarding topology.

Example details of a network router in which a control plane programs a forwarding plane with forwarding path elements are described in U.S. patent application Ser. No. 13/194,571, filed Jul. 29, 2011, and entitled PACKET FORWARDING PATH PROGRAMMING USING A HIGH-LEVEL DESCRIPTION LANGUAGE; and in U.S. Pat. No. 7,215,637, issued May 8, 2007, and entitled SYSTEMS AND METHODS FOR PROCESSING PACKETS, the entire contents of each of which are incorporated herein by reference.

Forwarding unit 38A receives inbound network traffic by IFCs 22, and packet processor 24A processes network traffic using internal forwarding path 66A. Packet processor 24A looks up outbound interfaces for and forwards transit network packets that are neither host-bound nor otherwise require a response of logical decision by the control plane as outbound traffic via outbound interfaces 37. Although described primarily with respect to a single packet processor 24A and a single forwarding path 66A, forwarding manager 16A for forwarding unit 38A may configure multiple packet processors 24 each having a separate and/or shared forwarding path 66. Forwarding unit 38A executes forwarding manager 16A software and presents interfaces to control unit 40 for configuring forwarding path 66A.

FIG. 4 is a conceptual diagram illustrating an example of a distributed priority queue and an inline priority queue. Distributed priority queue 76A and inline priority queue 72A are examples of, respectively, distributed priority queue 76 and inline priority queue 72 described above in relation to FIG. 3.

Distributed priority queue 76A of FIG. 4 includes several entries with a variety of protocols and sorted by the periodic interval for each entry. Each entry may correspond to either a TX or an RX link from a local network device with a peer router, such as network device 30 described above in relation to FIGS. 2 and 3. The head node 80 of distributed priority queue 76A is based on the lowest periodic interval and has a periodic interval length of three seconds. Other nodes in distributed priority queue 76A also have periodic intervals of three seconds. The priority may be determined by time of entry into distributed priority queue 76A, or other factors, as described above.

Inline priority queue 72A also includes several entries with a variety of protocols and sorted by the periodic interval for each entry. Head node 82 of inline priority queue 72 also has a periodic interval of three seconds. Comparing head node 80 to head node 82, processing circuitry on a network device would not swap the entry in distributed mode corresponding to head node 80 with the entry in the inline HW table corresponding to head node 82 of inline priority queue 72A.

In some examples, deleting the head node from each respective priority queue causes each respective priority queue to automatically designate a new head node. For example, deleting head node 80 from distributed priority queue 76A may cause a processor of the network device to automatically designate 81, i.e., 165.95.1.45 VRRP, as the new head node of distributed priority queue 76A.

Figure 5:
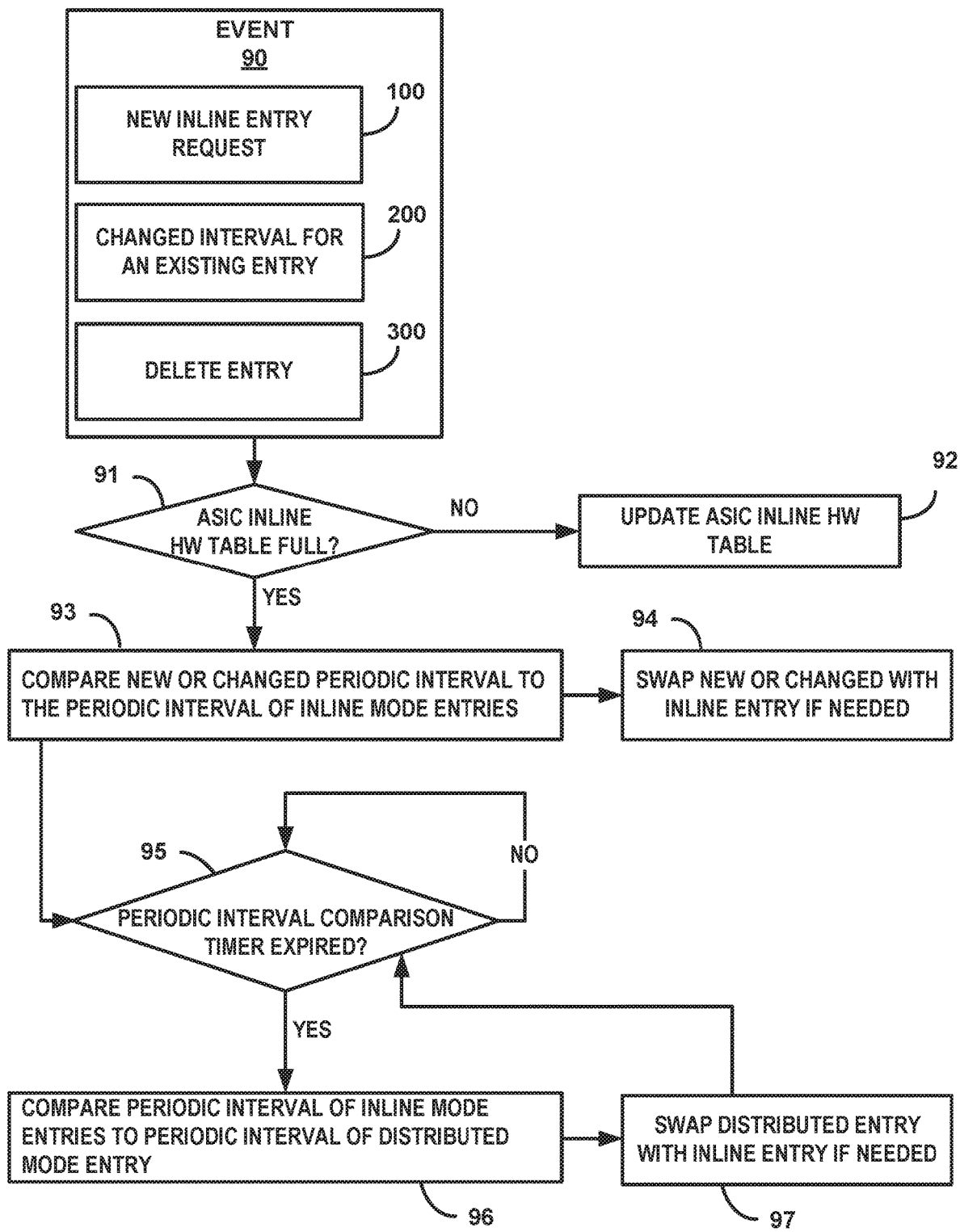
FIG. 5 is a flowchart illustrating example periodic packet management operations of a network device, in accordance with one or more aspects of this disclosure.

FIG. 5 is a flowchart illustrating example periodic packet management operations of a network device, in accordance with one or more aspects of this disclosure. As described above in relation to FIGS. 2, 3 and 4, when the inline hardware table or tables have no space available, the network device of this disclosure may dynamically and selectively compare periodic intervals of periodic packet communication entries. The network device may selectively swap entries into and out of the inline mode of operation based on detecting an event (90), such as a new entry (100), deleted entry (300) or changed entry (200), or upon the expiration of timer (95).

Any one of events 90 may introduce a periodic packet entry that may have a shorter periodic interval than an existing entry in one of the inline hardware tables of the network device. As described above, entries with shorter periodic intervals may be more efficiently handled in inline mode. Should any of events 90 occur, and the ASIC inline HW table has space available (NO branch of 91), then the network device may simply update the ASIC inline HW table (92).

When the ASIC inline HW table is full (YES branch of 91), then the network device, or more particularly a processor on the network device executing a periodic packet management program, will compare the periodic interval for the new entry, or the changed entry to the periodic interval of the entry associated with the head node of the inline priority queue. Based on the results of the comparison, the network device may swap the new or changed entry with an existing entry in the ASIC inline HW table (94).

In addition, the network device monitors a comparison timer (95). When the comparison timer has expired (YES branch of 95), the network device may compare the periodic interval of the head node of the distributed priority queue to the periodic interval of the head node of the inline priority queue. Based on which head node has the shortest periodic interval, the network device may swap the distributed entry with the inline entry (97) and update the associated priority queue if needed. The swapping sequence continues continue until the periodic interval of head node of the distributed priority queue is less than the periodic interval for the head node of the inline priority queue. The comparison timer is an additional check to make that entries with a node in a timer queue go through the comparison process when the timer node expires. Comparison and swapping for entries with nodes in a timer queue are inhibited until the timer node expires and the node is added to one of the priority queues. The timer interval for the comparison timer will be much larger than timer queue expiration time to avoid any unnecessary comparison.

Figure 6A:
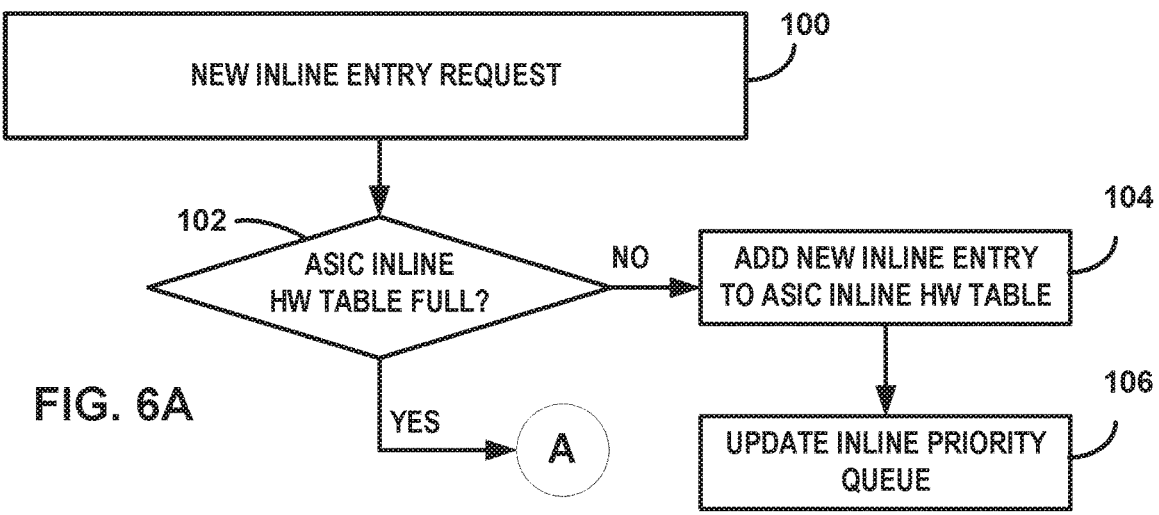
FIGS. 6A-6C are flowcharts illustrating example operations of a network device of this disclosure for a variety of scenarios, in accordance with one or more aspects of this disclosure.
Figure 6B:
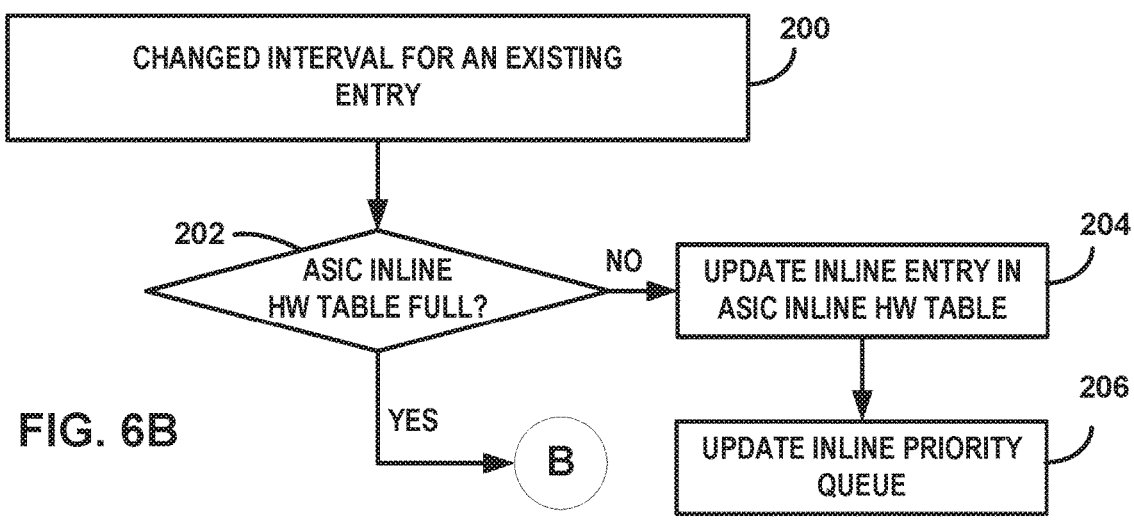
Figure 6C:
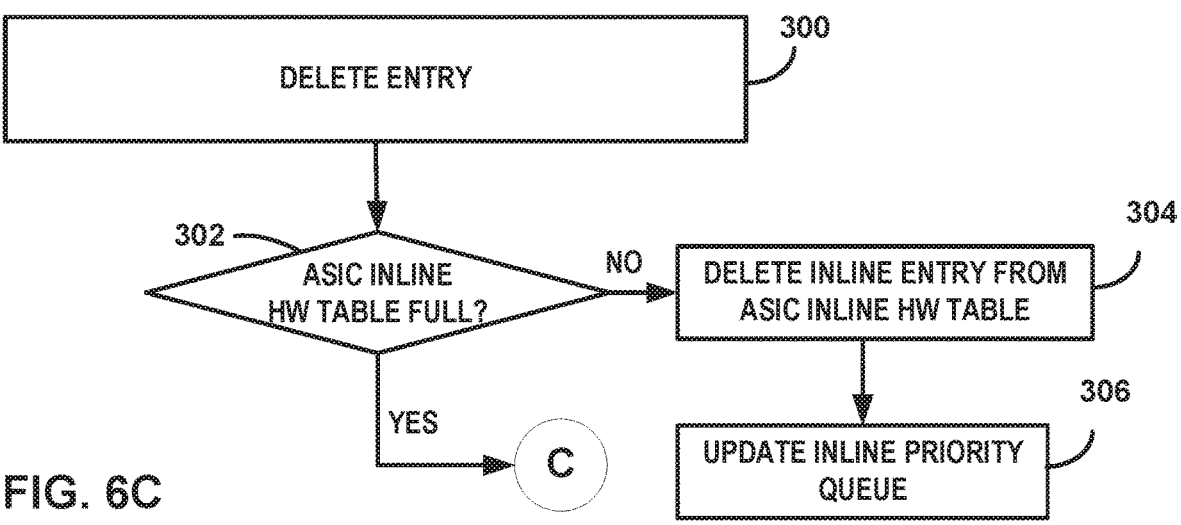

FIGS. 6A-6C are flowcharts illustrating example operations of a network device of this disclosure for a variety of periodic packet management scenarios, in accordance with one or more aspects of this disclosure. A processor of the network device may execute the steps of any of FIGS. 6A-6C.

FIG. 6A illustrates an example of a new line entry request (100). A new inline entry request may the result a new session negotiated with a peer network device, for example between router 12B and router 12E depicted in FIG. 1. A new inline entry request may also be the result of a manual entry by a user of a network device.

If an ASIC inline hardware table has space available (NO branch of 102) then the processor may add the new inline entry to the ASIC inline hardware table (104). In some examples, the processor may also update the inline priority queue by adding a node for the new entry to the inline priority queue (106). In other examples, if the ASIC inline hardware table is not full and periodic packets are not operating in distributed mode, then the network device may not use an inline priority queue until needed to compare nodes with a distributed priority queue. If the ASIC inline hardware table is full (YES branch of 102), then the processor may execute the steps described in FIG. 7, beginning at "A." Once the ASIC inline hardware table is full, one node for each inline entry is created in inline priority queue.

FIG. 6B illustrates an example of a changed periodic interval for an existing inline entry (200). As with FIG. 6A, if the ASIC inline hardware table is not full (No branch of 202), then the processor may program the ASIC inline hardware table with the new periodic interval for the associated entry, and in some examples may update the inline priority queue (206), such as inline priority queue 72 described above in relation to FIG. 3. If the ASIC inline hardware table is full (YES branch of 202), then the processor may execute the steps depicted in FIG. 8, beginning at "B."

As described above in relation to FIG. 1, a periodic interval for an entry may change based on a direct change by a user or administrator of a network device. A change in the periodic interval for an entry may be an increase or a decrease in the periodic interval. An increase in the periodic interval (reduced frequency) for an inline entry may mean the inline entry is better suited to be managed in distributed mode rather than inline mode.

FIG. 6C illustrates an example of a request to delete an entry from the ASIC inline hardware table (300). If there is space available in the ASIC inline hardware table from which the entry is to be deleted (NO branch of 302), the network device processor may simply reprogram the ASIC to delete the entry (304). In some examples, the processor may also update the inline priority queue to delete the node associated with the delete entry from the ASIC inline hardware table (306). If the ASIC inline hardware table is full (YES branch of 302), then deleting an entry may open space in the table to move a periodic packet entry from distributed mode to the more efficient inline mode. Therefore, the processor for the network device may execute the steps depicted in FIG. 9 beginning with "C."

Figure 7:
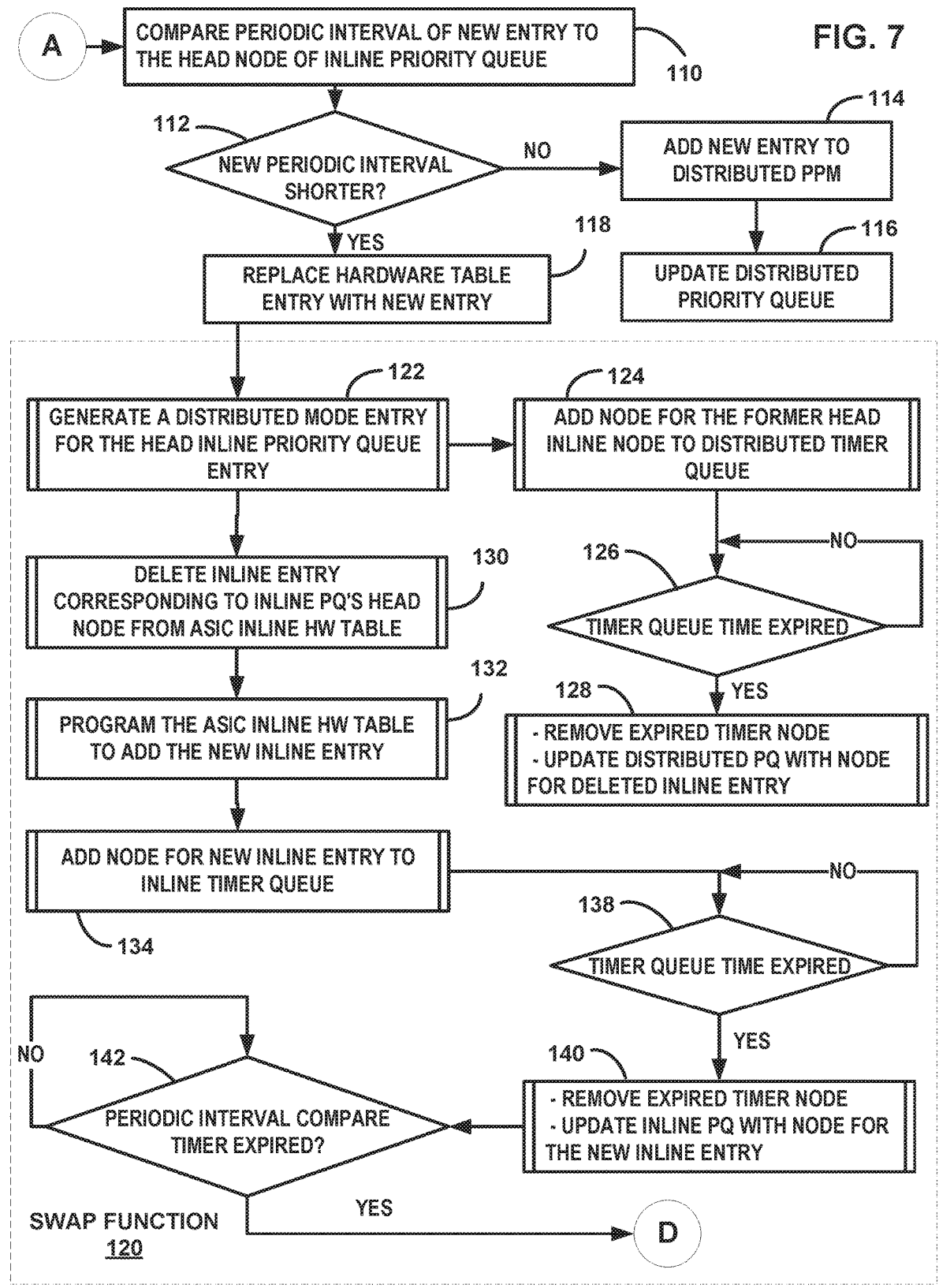
FIG. 7 is a flowchart illustrating an example process by which a network device may swap entries between periodic packet management modes used for periodic packet communication with peer network devices, in accordance with one or more aspects of this disclosure.

FIG. 7 is a flowchart illustrating an example process by which a router may swap entries between periodic packet management modes used for periodic packet communication with a peer router, in accordance with one or more aspects of this disclosure. As described above in relation to FIGS. 3 and 5A, a periodic packet management module, such as PPMD 15 may receive a request for a new inline entry, but the ASIC inline hardware table is full. PPMD 15, executing on a processor of the network device such as microprocessor 52 depicted in FIG. 3, may compare the periodic interval of the new entry to the head node of the inline priority queue (110).

If the periodic interval for the new entry is longer than the periodic interval for the inline priority queue head node (NO branch of 112), PPMD 15 may add the new entry to operate under distributed mode (114) and assign the distributed entry to one of forwarding units 38 depicted in FIGS. 2 and 3. PPMD 15 also updates the distributed priority queue to add a node corresponding to the new entry according to the priority rules configured for the distributed priority queue (116). If the periodic interval for the new entry is shorter than the periodic interval for the inline priority queue head node (YES branch of 112), PPMD 15 replaces the entry in the ASIC inline hardware table with the new entry (118) according to the subprocesses in swap function 120.

To make sure the periodic packets for the inline entry to be removed from the ASIC inline hardware table continue to be processed, the techniques of this disclosure first generate a distributed mode entry for the head inline priority queue entry (122) before deleting the entry from the ASIC inline hardware table. To prevent churning of entries in and out of inline mode, PPMD 15 generates a node in the distributed timer queue corresponding to the entry in the ASIC inline hardware table associated with the head node of the inline priority queue (124). In other words, PPMD 15 generates a node in the distributed timer queue for the entry that is to be deleted from the ASIC inline hardware table. After the timer associated with that timer queue node expires (YES branch of 126), PPMD 15 removes the expired timer node and updates the distributed priority queue by adding a node for the deleted inline entry, which is now a new distributed mode entry (128). The priority assigned to the new distributed mode entry will follow the rules for the distributed priority queue, e.g., based on the length of the periodic interval.

After creating a distributed mode entry, PPMD 15 deletes the inline entry corresponding to the inline priority queues head node from the ASIC inline hardware table (130) to create room for the new entry request. As described above in relation to FIG. 3, PPMD 15, or PPM 36A executing on forwarding unit processor 62A, may program the ASIC inline hardware table, e.g. inline hardware table 54A, with the new inline entry (132). PPMD 15 adds a node to the inline timer queue corresponding to the new inline entry (134). Once the timer associated with that node in the timer queue expires (YES branch of 138), PPMD 15 removes the expired timer node from the inline timer queue and updates the inline priority queue to add a node associated with the new inline entry (140). Once the node associated with the new inline entry is in the inline priority queue, the new inline entry may be subject to a swap to distributed mode based on a comparison of the periodic interval.

The techniques of this disclosure also include a periodic comparison timer, as described above in relation to FIG. 3 (142). While actual entries under distributed mode and inline mode are not subject to comparison while an associated node is in a timer queue, other events may have occurred within periodic packet management for a network device. For example, new entries may have been added, periodic intervals may have been changed, and entries may have been deleted. The comparison timer (142) ensures that entries with nodes in the timer queue are also subject to comparison when the timer for the timer queue node expires and the node is moved to either the inline priority queue or the distributed priority queue. Therefore, one the comparison timer expires (YES branch of 142), PPMD 15 may cause a network processor to execute the steps depicted in FIG. 10, beginning with "D."

Figure 8:
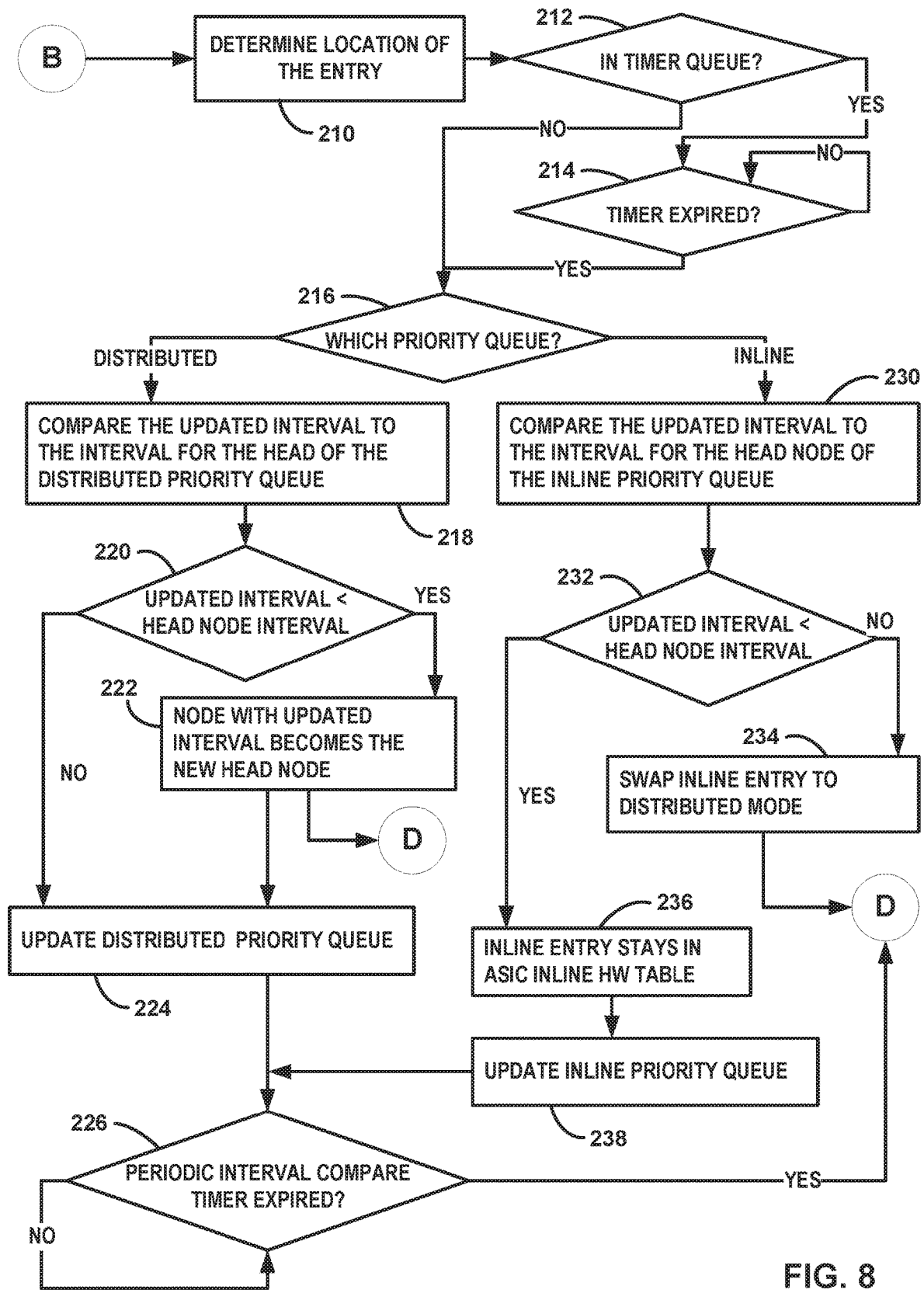
FIG. 8 is a flowchart illustrating an example process by which a network device may update the entries in distributed mode and inline mode when the periodic interval for an entry is changed.

FIG. 8 is a flowchart illustrating an example process by which a router may update the entries in distributed mode and inline mode when the periodic interval for an entry is changed. As described above in relation to FIGS. 3 and 5B, PPMD 15 may receive a request to change the periodic interval for an existing entry operating either by distributed mode or inline mode. In some examples, the process for distributed mode may also apply to centralized mode, depending on the configuration of the network device.

Upon receiving a request to change the periodic interval for an existing entry, PPMD 15 may determine the location of the entry (210). If the entry is in a timer queue (YES branch of 212), the PPMD 15 may wait until the timer expires (YES branch of 214). If the entry is not in a timer queue (NO branch of 212), PPMD 15 determines which priority queue has a node associated with the entry (216).

In the example of an entry operating under distributed mode (DISTRIBUTED branch of 216), PPMD 15 updates the periodic interval for the actual entry. PPMD 15 compares the updated periodic interval to the periodic interval for the entry associated with the head node of the distributed priority queue (218). In the example in which the updated interval is shorter than the periodic interval for the head node of the distributed priority queue (YES branch of 220), the node with the updated periodic interval becomes the head node of the distributed priority queue (222) according to the rules of the distributed priority queue. Also, the new head node of the distributed priority queue should be compared to the head node of the inline priority queue by following the steps depicted in FIG. 10, beginning with "D."

In the example in which the updated periodic interval is longer than the periodic interval for the head node of the distributed priority queue (NO branch of 220), PPMD 15 updates the distributed priority queue to re-order the nodes of the distributed priority queue according to the length of the periodic interval (224). PPMD 15 also performs step 224 after setting the entry with the updated periodic interval as the new head node (222). In some examples, PPMD 224 may perform step 224 before the comparison step 222. As described above in relation to FIG. 7, PPMD 15 may perform further comparisons as the priority comparison timer expires (226).

In the example of an entry operating under inline mode (INLINE branch of 216), PPMD 15 programs the ASIC inline hardware table to update the periodic interval for the actual entry and compares the updated periodic interval to the periodic interval for the head node of the inline priority queue (230). When the updated periodic interval is less than the periodic interval for the head node, then the inline entry would stay in the ASIC inline hardware table (236). PPMD 15 would update the node in the inline priority queue associated to the entry with the updated periodic interval and rearrange the inline priority queue according to the priority rules for the inline priority queue (238). PPMD 15 then waits for the comparison timer to expire to perform the comparison check by following the steps in FIG. 10 beginning with "D." For either inline mode or distributed mode, upon receiving a change to the periodic interval, the actual entry in either distributed mode or inline mode will be changed whether or not the change results in a swap.

When the updated periodic interval is more than the periodic interval for the head node (NO branch of 232), then the inline entry with the updated periodic interval may need to be swapped and operate under distributed mode (234). PPMD 15 may execute the steps depicted in FIG. 10 to compare the entry with the updated periodic interval as depicted in FIG. 8.

Figure 9:
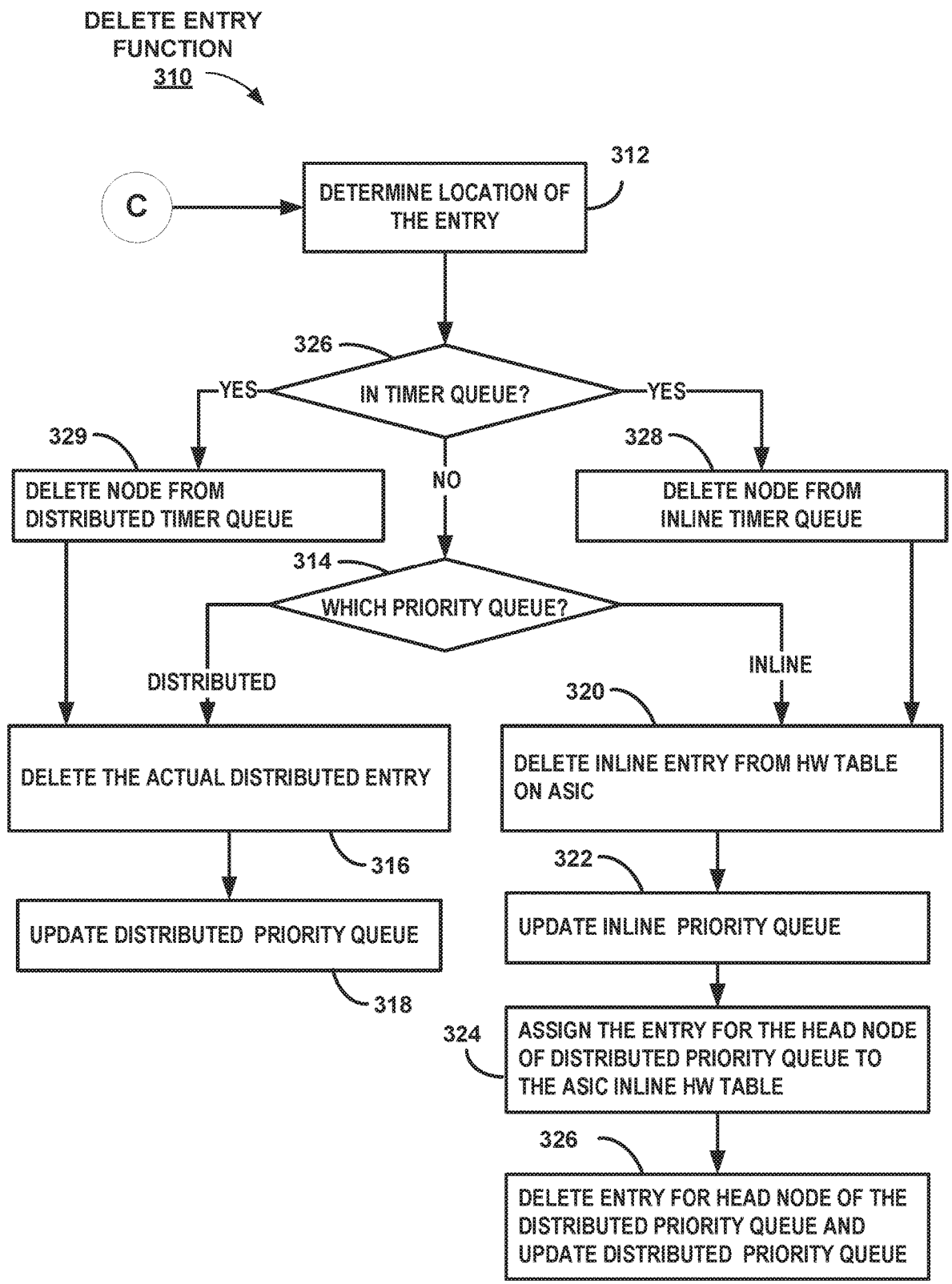
FIG. 9 is a flowchart illustrating an example process by which a network device may delete an inline entry in the example when the inline hardware table is full.

FIG. 9 is a flowchart illustrating an example process by which a router may delete an entry in the example when the inline hardware table is full. As described above, any periodic packet entry that could be managed using inline mode may instead be managed in distributed mode if the ASIC inline hardware table is full. As described above in relation to FIGS. 3 and 5C, PPMD 15 may receive a request to delete an entry from an ASIC inline hardware table, such as one of inline hardware tables 54 depicted in FIG. 3. However, the entry may be handled by either inline mode or distributed mode if the ASIC inline hardware table is full. Therefore, a request to delete an entry will cause a processor of a network device to execute the steps of delete entry function 310 (function 310).

Similar to FIG. 8, described above, for function 310, PPMD 15 determines the location of the entry to be deleted (312). In some examples, the entry to be deleted may have recently been swapped to the distributed mode and have an associated node in either the inline timer queue or the distributed timer queue, or have a node assigned to the distributed priority queue. When the entry to be deleted has a node in the timer queue (YES branches of 326) PPMD 15 may cause a processor to delete the node from the inline timer queue (328) or from the distributed timer queue (329). For the inline timer queue case, the processor will program the chipset to delete the actual entry from the ASIC inline hardware table (320). For the distributed timer queue branch (329), the processor will delete the actual distributed entry (316). When the entry to be deleted has a node in the distributed timer queue, there will be no node in the distributed priority queue, so the processor will have no need to update the priority queue (318).

When the entry to be deleted is not in a timer queue (NO branch of 326), PPMD 15 may determine in which priority queue the entry has a node (314). When the node is in the distributed priority queue (DISTRIBUTED branch of 314), the instructions within PPMD 15 may cause a processor to delete the distributed mode entry (316) and update the distributed priority queue to delete the node associated with the deleted entry from the distributed priority queue (318).

Similarly, when the node is in the inline priority queue ONLINE branch of 314), PPMD 15 may cause a processor to delete the inline entry from the ASIC inline hardware table (320) and update the inline priority queue to delete the node associated with the deleted entry from the inline priority queue (322). Deleting the entry from the ASIC inline hardware table may provide an opportunity to move an entry from distributed mode to the more efficient inline mode. PPMD 15 may cause a processor to assign the distributed entry associated with the head node of the distributed priority queue to be handled by the inline mode by programming the ASIC inline hardware table with the entry associated with the head node of the distributed priority queue (324). The processor then deletes the entry from the periodic packet communication links handled by the distributed mode, deletes the head node from the distributed priority queue, and updates the distributed priority queue with a new head node (326).

Figure 10:
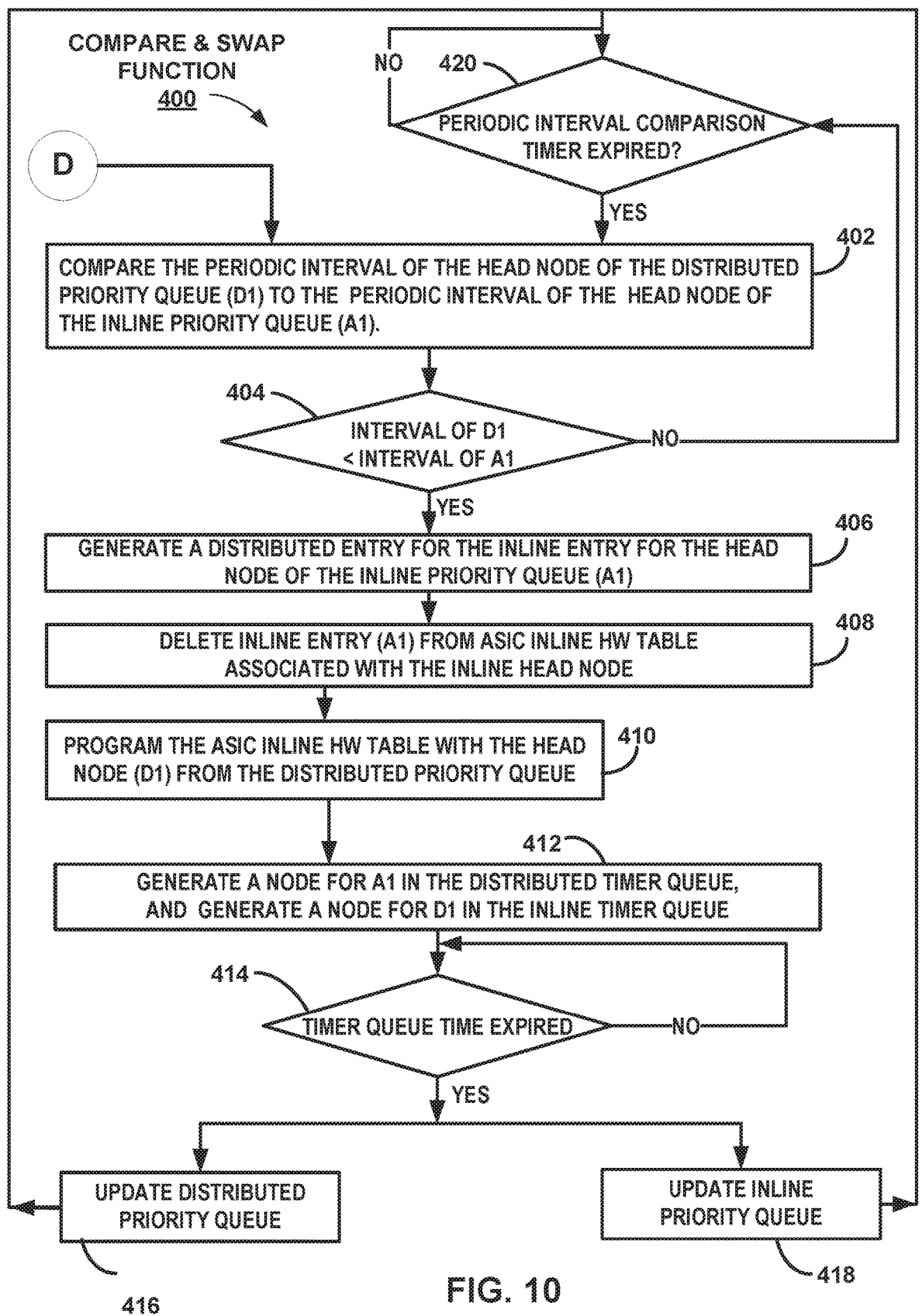
FIG. 10 is a flowchart illustrating an example of comparison process that may be implemented by a network device to swap entries between periodic packet management modes, in accordance with one or more aspects of this disclosure.

FIG. 10 is a flowchart illustrating an example of comparison process that may be implemented to swap entries between periodic packet management modes, in accordance with one or more aspects of this disclosure. As described above in relation to FIGS. 6-8, compare and swap function 400 (function 400) may be called based on an event, such as a new entry, deleted entry or changed entry, or upon the expiration of timer.

PPMD 15, described above in relation to FIGS. 2 and 3, may cause a processor to compare the periodic interval of the head node of the distributed priority queue to the periodic interval of the head node of the inline priority queue (402). To simplify the description, the distributed entry associated with the head node of the distributed priority queue will be referred to as D1 and the inline entry associated with the head node of the inline priority queue will be referred to as A1.

When the periodic interval for the entry (D1) associated with the head node of the distributed priority queue is shorter than the periodic interval for the entry (A1) in the ASIC inline hardware table associated with the head node of the inline priority queue than the shorter interval may be better suited to be managed in the inline mode. PPMD 15 may cause a processor to generate a new distributed entry (406) before deleting the inline entry (A1) to ensure the periodic packets for A1 continue to be processed. Once the distributed entry for A1 has been generated, the processor may delete the inline entry A1 from the ASIC inline hardware table (408).

Once space is available in the ASIC inline hardware table, the processor programs the ASIC inline hardware table with the entry (D1) associated with the head node of the distributed priority queue (410), as well as delete the entry (D1) from the distributed mode management. In this state, the periodic packets for both D1 and A1 continue to be processed. However, for A1, deleted from the ASIC inline hardware table, is handled in distributed mode and for D1, added to the ASIC inline hardware table, is handled by inline mode.

Similar to the timer queue described above in relation to FIGS. 3 and 6, the processor creates a node in the distributed timer queue associated with A1 and a node in the inline timer queue for the entry associated with D1, which is now programmed into the ASIC inline hardware table (412). While the timers for each node are counting A1 and D1 are not subject to the comparison of blocks 402 and 404 described above (NO branch of 414). In some examples the timer interval for the respective node in the respective timer queue may be the same. In other examples, the timer intervals may be different, as described above in relation to FIG. 3.

In some examples, the processor may delete the head node in the inline priority queue at approximately the same time as the processor adds a node to the distributed timer queue (412). Similarly, the processor may delete the head node in the distributed priority queue at approximately the same time as the processor adds a node to the inline timer queue (412). In some examples, deleting the head node from each respective priority queue causes each respective priority queue to automatically designate a new head node.

When the timers for each respective node expire (YES branch of 414), the processor updates the distributed priority queue (416) by deleting the node from the expired timer queue and adding a similar node associated with A1 to the distributed priority queue, according to the priority rules the distributed priority queue. Similarly, the updates the inline priority queue (418) by deleting the node from the expired timer queue and adding a similar node associated with D1 to the inline priority queue, according to the priority rules the inline priority queue. PPMD 15 may then wait for the next even, e.g. changed periodic interval, or wait for the interval comparison timer to expire (YES branch of 420) before executing the compare and swap function 400 again.

Various examples of the disclosure have been described. These and other examples are within the scope of the following claims.

What is claimed is:

1. A method comprising:
   detecting, by a network device, an event, wherein the event triggers management of one or more periodic packet entries handled by the network device;

in response to detecting the event, determining whether an inline hardware table has space available;

in response to determining that there is no space available in the inline hardware table, comparing, by the network device, a first periodic interval of a head node of a first priority queue to a second periodic interval of a head node of a second priority queue:

wherein the first priority queue comprises first nodes associated with a first set of entries operating under a distributed mode of periodic packet management, wherein in the distributed mode, periodic packet management is handled by processing circuitry at a software level of the network device, wherein a head node of the first priority queue is associated with a distributed entry with the first periodic interval, wherein the first periodic interval is the shortest periodic interval relative to the first nodes in the first priority queue, wherein the second priority queue comprises second nodes associated with a second set of entries operating under an inline mode of periodic packet management, wherein in the inline mode, periodic packet management is handled by processing circuitry at a hardware level of the network device;

wherein the head node of the second priority queue is associated with an inline entry with the second periodic interval, wherein the second periodic interval is the longest periodic interval relative to the second nodes in the second priority queue; and in response to determining based on the comparing that the first periodic interval is shorter than the second periodic interval, swapping, by the network device, the inline entry associated with the head node of the second priority queue to the first set of entries and the distributed entry associated with the head node of the first priority queue to the second set of entries.

2. The method of claim 1, wherein the event comprises determining, by the network device, whether a first time interval has expired, the method further comprising:

in response to determining that the first time interval has not expired, waiting to compare the head node of the first priority queue to the head node of the second priority queue; and in response to determining that the first time interval has expired, comparing the head node of the first priority queue to the head node of the second priority queue.

3. The method of claim 1, wherein the inline entry is a first inline entry, the method further comprising:

in response to assigning the first inline entry associated with the head node of the second priority queue to the first set of entries operating under distributed mode:

deleting, by the network device, the first inline entry from the second set of entries operating under the inline mode;

deleting, by the network device, the head node of the second priority queue;

updating the head node of the second priority queue, wherein updating the head node of the second priority queue causes the head node to be associated with a second inline entry of the second set of entries operating under the inline mode, and wherein the second inline entry has a third periodic interval.

4. The method of claim 3, further comprising:

in response to deleting the head node of the second priority queue, generating, by the network device, a first node in a distributed timer queue, wherein the first node in the distributed timer queue is associated with the inline entry added to the first set of entries operating under distributed mode;

determining whether a second time interval for the first node in the distributed timer queue has expired;

in response to determining that the second time interval has expired, adding a first new node to the first priority queue, wherein the first new node is associated with the inline entry assigned to the first set of entries operating under distributed mode.

5. The method of claim 3, further comprising:

in response to assigning, by the network device, the distributed entry associated with the head node of the first priority queue to the second set of entries operating under the inline mode:

deleting, by the network device, the head node of the first priority queue;

generating, by the network device, a first node in an inline timer queue, wherein the first node in the inline timer queue is associated with the distributed entry added to the second set of entries operating under inline mode;

determining whether a third time interval for the first node in the inline timer queue has expired;

in response to determining that the third time interval has expired, adding a second new node to the second priority queue, wherein the second new node is associated with the distributed entry assigned to the second set of entries operating under inline mode.

6. The method of claim 1, wherein the event comprises receiving, by the network device, a new entry with an associated third periodic interval, the method further comprising:

comparing the third periodic interval to the periodic interval for the head node of the second priority queue;

in response to determining based on the comparing that the third periodic interval is shorter than the periodic interval for the head node of the second priority queue:

assigning, by the network device, a second inline entry associated with the head node of the second priority queue to the first set of entries operating under the distributed mode;

in response to assigning the second inline entry associated with the head node of the second priority queue to the first set of entries:

deleting the second inline entry associated with the head node of the second priority queue from the second set of entries; and deleting the head node of the second priority queue from the second priority queue;

assigning, by the network device, the new received entry to the second set of entries operating under the inline mode.

7. The method of claim 6, further comprising:

in response to determining based on the comparing that the third periodic interval is not shorter than the periodic interval for the head node of the second priority queue, assigning, by the network device, the new entry to the first set of entries operating under the distributed mode of periodic packet management.

8. The method of claim 6, further comprising:

in response to assigning the second inline entry associated with the head node of the second priority queue to the first set of entries operating under distributed mode:

generating, by the network device, a first node in an inline timer queue, wherein the first node in the inline timer queue is associated with the new entry added to the second set of entries operating under inline mode;

generating, by the network device, a first node in a distributed timer queue, wherein the first node in the distributed timer queue is associated with the second inline entry added to the first set of entries operating under distributed mode;

determining whether a second time interval for the first node in the inline timer queue has expired;

in response to determining that the second time interval has expired, adding a first new node to the second priority queue, wherein the first new node is associated with the new entry assigned to the second set of entries operating under inline mode;

determining whether a third time interval for the first node in the distributed timer queue has expired;

in response to determining that the third time interval has expired, adding a second new node to the first priority queue, wherein the second new node is associated with the second inline entry assigned to the first set of entries operating under distributed mode.

9. The method of claim 1, wherein the event comprises, detecting a change to a fourth periodic interval for a third inline entry of the second set of entries operating under inline mode, the method further comprising:
comparing, the fourth periodic interval to the periodic interval for the head node of the second priority queue;
in response to determining based on the comparing that the periodic interval for the head node of the second priority queue is shorter than the fourth periodic interval:
assigning, by the network device, the third inline entry to the first set of entries operating under the distributed mode;
in response to assigning the third inline entry to the first set of entries:
deleting the third inline entry from the second set of entries; and
deleting the node associated with the third inline entry from the second priority queue.

10. The method of claim 1, wherein the event comprises detecting a change to a fourth periodic interval second distributed entry of the first set of entries operating under distributed mode, the method further comprising:
comparing, the fourth periodic interval to the periodic interval for the head node of the second priority queue;
in response to determining based on the comparing that the fourth periodic interval is shorter than the periodic interval for the head node of the second priority queue:
assigning, by the network device, the second inline entry associated with the head node of the second priority queue to the first set of entries operating under the distributed mode;
in response to assigning the second inline entry associated with the head node of the second priority queue to the first set of entries:
deleting the second inline entry from the second set of entries; and
deleting the node associated with the second inline entry from the second priority queue.

11. The method of claim 3, wherein the distributed entry is a first distributed entry, the method further comprising:
deleting, by the network device, a third inline entry of the second set of entries operating under inline mode and deleting a node associated with the third inline entry from the second priority queue;

assigning, by the network device, a second distributed entry associated with the head node of the first priority queue to the second set of entries operating under the inline mode;

deleting, by the network device, the second distributed entry from the first set of entries operating under distributed mode and deleting the head node from the first priority queue; and updating the head node of the first priority queue, wherein updating the head node of the first priority queue causes the head node to be associated with a third distributed entry of the first set of entries operating under the distributed mode.

12. The method of claim 1, wherein swapping comprises:
assigning, by the network device, the inline entry associated with the head node of the second priority queue to the first set of entries operating under the distributed mode;
deleting, by the network device, the head node of the second priority queue, wherein deleting the head node of the second priority queue causes the network device to assign a second node of the second priority queue as the head node of the second priority queue; and
assigning, by the network device, the distributed entry associated with the head node of the first priority queue to the second set of entries operating under the inline mode.

13. A network device comprising:
a control unit configured to execute at least one periodic packet protocol, the control unit comprising:
a periodic packet manager (PPM) configured to:
detect an event;
determine whether an inline hardware table has space available;
in response to detecting the event and a determination that the inline hardware table has no space available, compare a first periodic interval of a head node of a first priority queue to a second periodic interval of a head node of a second priority queue;
in response to a determination, based on the comparison, that the first periodic interval for the head node of the first priority queue is shorter than the second periodic interval for the head node of the second priority queue:
add a first inline entry associated with the head node of the second priority queue to a first set of entries;
in response to adding the first inline entry to the first set of entries, delete the first inline entry from a second set of entries;
add a first distributed entry associated with the head node of the first priority queue to the second set of entries; and
in response to adding the first distributed entry to the second set of entries, delete the first distributed entry from the first set of entries.

14. The network device of claim 13, wherein the periodic packet manager is further configured to:
execute a timer and wherein the event comprises a determination of whether a first time interval has expired based on the timer;
in response to the determination that the first time interval has not expired, wait to compare the head node of the first priority queue to the head node of the second priority queue; and in response to the determination that the first time interval has expired, compare the head node of the first priority queue to the head node of the second priority queue.

15. The network device of claim 13, wherein the periodic packet manager is further configured to:
in response to the deletion of the first inline entry from a second set of entries, generate a first node in a distributed timer queue;
in response to the deletion of the first distributed entry from a first set of entries, generate a first node in an inline timer queue;
determine whether a first time interval for the first node in the inline timer queue has expired;
in response to the determination that the first time interval has expired, generate a first new node in the first priority queue associated with the inline entry assigned to the first set of entries;
determine whether a second time interval for the first node in the inline timer queue has expired; and
in response to the determination that the second time interval has expired, generate a second new node in the second priority queue associated with the distributed entry assigned to the second set of entries.

16. The network device of claim 13, wherein the event comprises a change to a third periodic interval for a second inline entry of the second set of entries, wherein the periodic packet manager is further configured to:
compare the third periodic interval to the periodic interval for the head node of the second priority queue;
in response to determining based on the comparison that the periodic interval for the head node of the second priority queue is shorter than the third periodic interval:
assign the second inline entry to the first set of entries;
in response to assigning the second inline entry to the first set of entries:
delete the second inline entry from the second set of entries; and
delete the node associated with the second inline entry from the second priority queue.

17. The network device of claim 13, wherein the event comprises a request to delete a third inline entry of the second set of entries, wherein the periodic packet manager is further configured to:
delete a third inline entry from the second set of entries;
delete a node associated with the third inline entry from the second priority queue;
assign to the second set of entries, a second distributed entry associated with the head node of the first priority queue;
delete, by the network device, the second distributed entry from the first set of entries and delete the head node from the first priority queue; and
updating the head node of the first priority queue, wherein updating the head node of the first priority queue causes the head node to be associated with a third distributed entry of the first set of entries operating under the distributed mode.

18. The network device of claim 13,
wherein the control unit comprises:
a first programmable processor;
a memory operatively coupled to the first programmable processor,
wherein the first programmable processor executes the periodic packet manager;
the network device further comprising a forwarding unit, the forwarding unit comprising:
a second processor,
a hardware table operatively coupled to the second processor, wherein the second set of entries is stored at the hardware table.

19. A computer-readable, non-transitory, storage medium encoded with instructions that when executed cause a programmable processor of the network device to:
execute at least one periodic packet protocol;
detect an event;
determine whether an inline hardware table has space available;
in response to detecting the event and a determination that the inline hardware table has no space available, compare a first periodic interval of a head node of a first priority queue to a second periodic interval of a head node of a second priority queue;
in response to a determination, based on the comparison, that the first periodic interval for the head node of the first priority queue is shorter than the second periodic interval for the head node of the second priority queue:
add a first inline entry associated with the head node of the second priority queue to a first set of entries;
in response to adding the first inline entry to the first set of entries, delete the first inline entry from a second set of entries;
add a first distributed entry associated with the head node of the first priority queue to the second set of entries; and
in response to adding the first distributed entry to the second set of entries, delete the first distributed entry from the first set of entries.

20. The computer-readable, non-transitory, storage medium of claim 19, wherein the event comprises a change to a third periodic interval for a second inline entry of the second set of entries, wherein the instructions that when executed cause the programmable processor of the network device to:
compare the third periodic interval to the periodic interval for the head node of the second priority queue;
in response to determining based on the comparison that the periodic interval for the head node of the second priority queue is shorter than the third periodic interval:
assign the second inline entry to the first set of entries;
in response to assigning the second inline entry to the first set of entries:
delete the second inline entry from the second set of entries; and
delete the node associated with the second inline entry from the second priority queue.

* * * * *